US007615963B2

(12) United States Patent
Tashiro et al.

(10) Patent No.: US 7,615,963 B2
(45) Date of Patent: Nov. 10, 2009

(54) CHARGING/DISCHARGING APPARATUS AND METHOD, POWER SUPPLYING DEVICE AND METHOD, POWER SUPPLYING SYSTEMS AND METHOD, PROGRAM STORING MEDIUM, AND PROGRAM

(75) Inventors: Kei Tashiro, Kanagawa (JP); Hideyuki Sato, Chiba (JP); Kiyotaka Murata, Saitama (JP); Toshio Takeshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/257,295

(22) PCT Filed: Feb. 8, 2002

(86) PCT No.: PCT/JP02/01088

§ 371 (c)(1),
(2), (4) Date: Jul. 3, 2003

(87) PCT Pub. No.: WO02/065614

PCT Pub. Date: Aug. 22, 2002

(65) Prior Publication Data

US 2004/0027093 A1 Feb. 12, 2004

(30) Foreign Application Priority Data

| Feb. 14, 2001 | (JP) | 2001-37410 |
| Feb. 14, 2001 | (JP) | 2001-37411 |
| Feb. 14, 2001 | (JP) | 2001-37413 |
| Jan. 23, 2002 | (JP) | 2002-14448 |

(51) Int. Cl.
*H02J 7/00* (2006.01)
(52) U.S. Cl. ............................... 320/106; 320/107

(58) Field of Classification Search ............... 320/128, 320/106, 107; 324/426; 429/40, 206; 396/79, 396/89
See application file for complete search history.

(56) References Cited

U.S. PATENT DOCUMENTS 5,077,151 A * 12/1991 Yasuda et al. ............... 429/206

(Continued)

FOREIGN PATENT DOCUMENTS

CN 1461513 12/2003

(Continued)

OTHER PUBLICATIONS

IBM Technical Disclosure Bulletin, vol. 37, No. 6A, Jun. 1994, pp. 609-610.

(Continued)

*Primary Examiner*—Edward Tso
*Assistant Examiner*—Richard V Muralidar
(74) *Attorney, Agent, or Firm*—Frommer Lawrence & Haug LLP; William S. Frommer; Thomas F. Presson

(57) ABSTRACT

In the present invention, a battery pack type discriminating or deciding concave portion (131) is formed at a position corresponding to a battery pack type deciding switch (214) of an SQ battery pack (1) and when the SQ battery pack (1) is set, the battery pack type deciding switch (214) is avoided to be pressed by a bottom (115) of the SQ battery pack (1) owing to the concave portion (131). In this way, as the switch (214) is avoided to be pressed, it is recognized that the set battery pack is an SQ battery pack (1) under charging. Therefore, according to the present invention, it is possible to identify battery packs among different charging modes and charging can be performed in a proper charging mode.

9 Claims, 20 Drawing Sheets

U.S. PATENT DOCUMENTS

| | | | |
|---|---|---|---|
| 5,206,097 A | 4/1993 | Burns et al. | 429/90 |
| 5,248,927 A | 9/1993 | Takei et al. | 320/113 |
| 5,258,802 A * | 11/1993 | Arimoto et al. | 396/79 |
| 5,399,446 A | 3/1995 | Takahashi | 429/90 |
| 5,565,759 A * | 10/1996 | Dunstan | 320/135 |
| 5,596,567 A | 1/1997 | de Muro et al. | 320/106 |
| 5,602,454 A | 2/1997 | Arakawa | 320/106 |
| 5,606,242 A * | 2/1997 | Hull et al. | 320/106 |
| 5,717,314 A | 2/1998 | Wakefield | |
| 5,844,400 A * | 12/1998 | Ramsier et al. | 320/106 |
| 5,949,220 A | 9/1999 | Ide et al. | 320/165 |
| 6,124,698 A * | 9/2000 | Sakakibara | 320/110 |
| 6,133,711 A * | 10/2000 | Hayashi et al. | 320/128 |
| 6,326,766 B1 * | 12/2001 | Small | 320/112 |
| 2004/0027093 A1 | 2/2004 | Tashiro et al. | |
| 2005/0225296 A1* | 10/2005 | Tashiro et al. | 320/134 |
| 2005/0225297 A1 | 10/2005 | Tashiro et al. | |
| 2005/0225298 A1 | 10/2005 | Tashiro et al. | |

FOREIGN PATENT DOCUMENTS

| | | |
|---|---|---|
| DE | 195 17 117 | 11/1996 |
| EP | 0 549 950 | 7/1993 |
| EP | 0 572 327 | 12/1993 |
| EP | JP06019264 A2 | 1/1994 |
| EP | 0 588 728 | 3/1994 |
| EP | 0588728 | 3/1994 |
| EP | JP08013169 B4 | 2/1996 |
| EP | 0964497 | 12/1999 |
| EP | JP11355971 A2 | 12/1999 |
| EP | 1300921 * | 9/2003 |
| JP | 50 44432 | 4/1975 |
| JP | 64 10568 | 1/1989 |
| JP | 64 10586 | 1/1989 |
| JP | 1 309265 | 12/1989 |
| JP | 4 229027 | 8/1992 |
| JP | 4 286876 | 10/1992 |
| JP | 5 94953 | 12/1993 |
| JP | 5 335010 | 12/1993 |
| JP | 5 335036 | 12/1993 |
| JP | 6 20665 | 1/1994 |
| JP | 6 19264 | 3/1994 |
| JP | 6-104017 | 4/1994 |
| JP | 6 104017 | 4/1994 |
| JP | 6-105476 | 4/1994 |
| JP | 6 105476 | 4/1994 |
| JP | 6 209531 | 7/1994 |
| JP | 6 507998 | 9/1994 |
| JP | 8-45563 | 2/1996 |
| JP | 08045563 | 2/1996 |
| JP | 9 298841 | 11/1997 |
| JP | 9-298841 | 11/1997 |
| JP | 10 108383 | 4/1998 |
| JP | 10-509857 | 9/1998 |
| JP | 10 509857 | 9/1998 |
| JP | 10 271692 | 10/1998 |
| JP | 11 69636 | 3/1999 |
| JP | 11-150882 | 6/1999 |
| JP | 11 150882 | 6/1999 |
| JP | 11 297366 | 10/1999 |
| JP | 11 329509 | 11/1999 |
| JP | 11-329509 | 11/1999 |
| JP | 11 355971 | 12/1999 |
| JP | 2000 500717 | 1/2000 |
| JP | 2000 243361 | 9/2000 |
| JP | 2000 243365 | 9/2000 |
| JP | 2001 500717 | 1/2001 |
| JP | 2001-359245 | 12/2001 |
| JP | 2001 359245 | 12/2001 |
| JP | 2002 238175 | 8/2002 |
| JP | 2002 238178 | 8/2002 |
| WO | WO 96/10858 | 4/1996 |
| WO | WO-02065612 * | 8/2002 |
| WO | WO-02065614 * | 8/2002 |

OTHER PUBLICATIONS

NiMH and NiCd battery management; 2407 Microprocessors and Microsystems 19 (1995); April, No. 3, Jordan Hill, Oxford, GB; pp. 165-174.

IBM Technical Disclosure Bulletin, vol. 35, No. 3, Aug. 1992, pp. 420-421.

IBM Technical Disclosure Bulletin, vol. 37, No. 3, Mar. 1994, pp. 1-2.

IBM Technical Disclosure Bulletin, vol. 38, No. 4, Apr. 1995, pp. 319-320.

* cited by examiner

| | Type of Battery Pack Deciding Switch | |
|---|---|---|
| | ON | OFF |
| Charging Mode Determining Data Present | Superquick Charging Mode | Quick Charging Mode |
| Charging Mode Determining Data Absent | Quick Charging Mode | Quick Charging Mode |

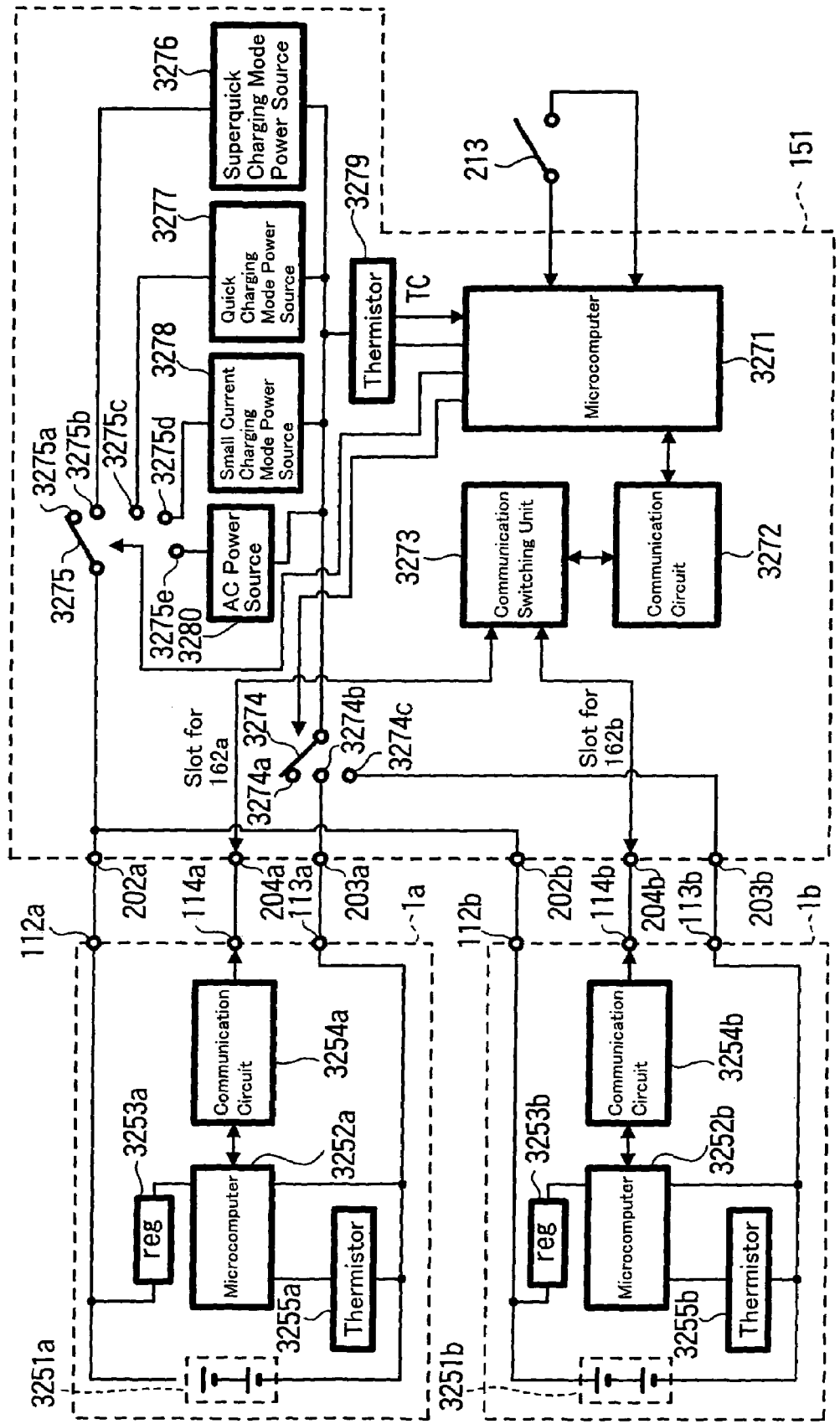

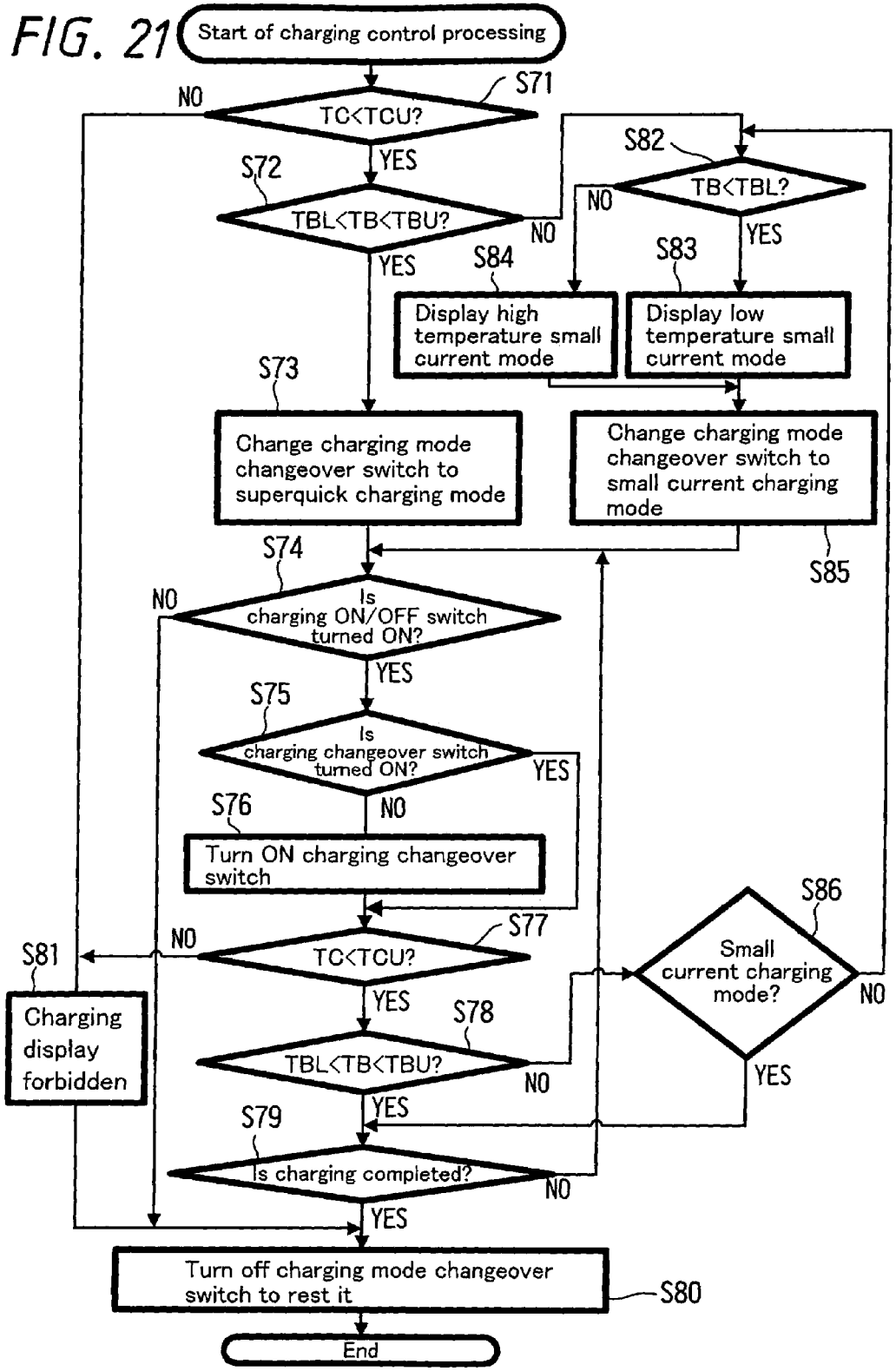

CHARGING/DISCHARGING APPARATUS AND METHOD, POWER SUPPLYING DEVICE AND METHOD, POWER SUPPLYING SYSTEMS AND METHOD, PROGRAM STORING MEDIUM, AND PROGRAM

TECHNICAL FIELD

The present invention relates to a charging/discharging apparatus and method, a power supplying apparatus and method, a power supplying system and method, program storing medium and program; and particularly to a charging/discharging apparatus and method, a power supplying apparatus and method, a power supplying system and method, a program storing medium and a program where such a constitution is employed that charging/discharging apparatuses with different power supplying systems are respectively identified so that they can be supplied with power in accordance with corresponding systems.

BACKGROUND ART

A so called charging/discharging technique is generally becoming popular in which power is supplied from such a power supplying apparatus as a battery charger to a charging/discharging apparatus represented by a battery pack used in a video camera or the like to charge the same.

In such a battery pack, a time required for charging (a charging time) increases in accordance with increase in an allowable operation time of a battery, namely, increase in charging capacity of the battery. Therefore, in order to solve a problem that the allowable operation time of the battery should be increased, the charging time must also be increased correspondingly. On the contrary, in order to solve a problem that the charging time should be shortened, the allowable operation time must also be shortened. Thus, it has been impossible to solve these problems conflicting with each other.

In recent years, however, in order to solve these problems, a battery pack and a battery charger have been technically advanced so that it has been made possible to charge a battery pack using large current as a charging current from a battery charger. As a result, even when the charging capacity of a battery pack is made large, it has been made possible to shorten a time required for charging (high speed charging).

However, even when a user purchases such a battery pack technically advanced, it is a rare case that a conventional type battery pack (requiring a long charging time) is discarded, and the conventional battery pack is often used together with the newly purchased battery pack of a high speed charging type.

However, a new type battery charger is different in charging (power supplying) system from the conventional battery charger, and a charging current of the former is larger than that of the latter. For this reason, for example, when the conventional type battery pack is erroneously set to the new battery charger, it may be damaged due to an overcurrent.

Moreover, it is known that a proper temperature range applied for charging is set to each battery pack, and when charging the battery pack is repeated with a large charging current as described above under conditions out of the proper temperature range, the characteristic of each cell of the battery pack varies and the charging capacity thereof gradually decreases. Accordingly, there is a problem that, when charging of a battery pack is repeated under the conditions beyond the proper temperature range of the battery pack, the life of the battery pack is shortened.

The present invention has been made in view of these circumstances and its object is to make it possible to identify a charging system or a temperature condition of a battery pack to charge the battery pack in accordance with a corresponding proper charging system.

DISCLOSURE OF THE INVENTION

A first charging/discharging apparatus of the present invention comprises a receiving terminal for receiving power from a power supplying apparatus, a position controlling portion for controlling a relative position with the power supplying apparatus such that the receiving terminal is connected with a supplying terminal to which the power supplying apparatus supplies power, and a setting portion for setting a receivable power supplying mode.

It is possible to make the power supplying mode include a first, or superquick, mode or a second, or quick, mode.

It is allowed to select a current value for supplying power in the superquick mode is larger than that in the quick mode.

A first power supplying apparatus of the present invention is provided with setting portion detecting means for detecting presence or absence of the setting portion, identifying means for identifying a power supplying mode in accordance with a detection result obtained by the setting portion detecting means and power supplying means for supplying the power to the charging/discharging apparatus from a supplying terminal in the power supplying mode identified by the identifying means.

It is possible to make the power supplying mode include a superquick mode or a quick mode.

It is allowed to select a current value for supplying power in the superquick mode is larger than that in the quick mode.

It is possible to further provide setting detecting means for detecting whether or not the charging/discharging apparatus is set for the first power supplying apparatus and make attaching portion detecting means detect presence or absence of an attaching portion at the timing before it is detected that the charging/discharging apparatus is attached by the setting detecting means.

A first power supplying method of the present invention is characterized by comprising a setting portion detecting step for detecting presence or absence of a setting portion, an identifying step for identifying a power supplying mode in accordance with a detection result of the processing in the setting portion detecting step, and a power supplying step for supplying the power to the charging/discharging apparatus from a supplying terminal in the power supplying mode identified by the processing in the identifying step.

A program in a first program storing medium of the present invention is characterized by comprising a setting portion detection controlling step for controlling detection of presence or absence of a setting portion, an identification controlling step for controlling identification of a power supplying mode in accordance with a detection result of the processing in said setting portion detecting step, and a power supply controlling step for controlling supply of the power to the charging/discharging apparatus from a supplying terminal in the power supplying mode identified by the processing in the identification controlling step.

A first program of the present invention is characterized by executing a setting portion detection controlling step for controlling detection of presence or absence of a setting portion, an identification controlling step for controlling identification of a power supplying mode in accordance with a detection result of the processing in the setting portion detection controlling step, and a power supply controlling step for controlling supply of the power to the charging/discharging apparatus from a supplying terminal.

A first power supplying system of the present invention is characterized in that the charging/discharging apparatus is provided with a receiving terminal for receiving power from the power supplying apparatus, a position controlling portion for controlling a relative position with the power supplying apparatus such that the receiving terminal is connected with a supplying terminal to which the power supplying apparatus supplies power, and a setting portion for setting a receivable power supplying mode; and the power supplying apparatus is provided with setting portion detecting means for detecting presence or absence of the setting portion, identifying means for identifying a power supplying mode in accordance with a detection result obtained by the setting portion detecting means, and power supplying means for supplying the power to the charging/discharging apparatus from the supplying terminal in the power supplying mode identified by the identifying means.

A second charging/discharging apparatus of the present invention is characterized by comprising receivable power supplying mode storing means for storing the information showing a receivable power supplying mode, and transmitting means for transmitting the information showing the power supplying mode stored by said receivable power supplying mode storing means to said power supplying apparatus.

It is possible to make the power supplying mode include a superquick mode or a quick mode.

It is allowed to select a current value for supplying power in the superquick mode is larger than that in the quick mode.

It is possible that the charging/discharging apparatus is further provided with a receiving terminal for receiving power from the power supplying apparatus, a position controlling portion for controlling a relative position with the power supplying apparatus such that the receiving terminal is connected with a supplying terminal to which the power supplying apparatus supplies power, and a setting portion at said position controlling portion for setting a receivable power supplying mode at said position controlling portion depending on presence or absence of said position controlling portion.

A second charging/discharging method of the present invention is characterized by comprising a receivable power supplying mode storing step for storing the information showing a receivable power supplying mode, and a power supplying step for supplying power to the charging/discharging in correspondence with the power supply mode received by the step of the receivable power supplying mode.

A program in a second program storing medium of the present invention is characterized by comprising a receivable power supply mode storage controlling step for controlling storage of the information showing a receivable power supplying mode, and a transmission controlling step for controlling transmission processing of the information showing the power supplying mode stored by the processing in the receivable power supplying mode storage controlling step to the power supplying apparatus.

A second program of the present invention executes a receivable power supplying mode storage controlling step for controlling storage of a receivable power supplying mode, and a transmission controlling step for controlling transmission processing of the information showing the power supplying mode stored by the processing in the receivable power supplying mode storage controlling step to the power supplying apparatus.

A second power supplying apparatus of the present invention is characterized by comprising receivable power supplying mode receiving means for receiving the information showing a receivable power supplying mode from the charging/discharging apparatus, and power supplying means for supplying power to the charging/discharging apparatus in correspondence with the power supplying mode received from said receivable power supplying mode receiving means.

It is possible to make the power supplying mode include a superquick mode or quick mode.

It is allowed to select a current value for supplying power in the superquick mode is larger than that in the quick mode.

To supply power to a charging/discharging apparatus provided with a setting portion for setting a receivable power supplying mode, it is possible to further provide setting portion detecting means for detecting presence or absence of the setting portion; and identifying means for identifying the power supplying mode in accordance with a detection result obtained by the setting portion detecting means where it is possible to make the power supplying means supply power to the charging/discharging apparatus in accordance with a matched power supplying mode when the power supplying mode received by the receivable power supplying mode receiving means matches with the power supplying mode identified by the identifying means.

A second power supplying method of the present invention is characterized by comprising a receivable power supplying mode receiving step for receiving the information showing a receivable power supplying mode from the charging/discharging apparatus, and a power supplying step for supplying power to the charging/discharging apparatus in correspondence with said power supplying mode received through the processing in said receivable power supplying mode receiving step.

A program in a third program storing medium of the present invention is characterized by comprising a receivable power supplying mode reception controlling step for controlling reception of the information showing a receivable power supplying mode from the charging/discharging apparatus, and a power supply controlling step for controlling supply of power to the charging/discharging apparatus c in correspondence with the power supplying mode received through the processing in the received power supplying mode reception controlling step.

A third program of the present invention is characterized by executing a receivable power supplying mode reception controlling step for controlling reception of the information showing a receivable power supplying mode from the charging/discharging apparatus, and a power supply controlling step for controlling supply of power to the charging/discharging apparatus in correspondence with the power supplying mode received through the processing in the received power supplying mode reception controlling step.

A second power supplying system of the present invention is characterized in that the charging/discharging apparatus is provided with receivable power supplying mode storing means for storing the information showing a receivable power supplying mode, and transmitting means for transmitting the information showing the power supplying mode stored by the receivable power supplying mode storing means to the power supplying apparatus; and the power supplying apparatus is provided with receivable power supplying mode receiving means for receiving the information showing a receivable power supplying mode from the charging/discharging apparatus and power supplying means for supplying power to the charging/discharging apparatus in correspondence with the power supplying mode received by the receivable power supplying mode receiving means.

It is possible to make the power supplying mode include a superquick mode or a quick mode.

It is allowed to select a current value for supplying power in the superquick mode is larger than that in the quick mode.

It is possible to further provide in the charging/discharging apparatus a receiving terminal for receiving power from a power supplying apparatus, a position controlling portion for controlling a relative position with the power supplying apparatus such that the receiving terminal is connected with a supplying terminal to which the power supplying apparatus supplies power, and a setting portion at the position controlling portion for setting a receivable power supplying mode depending on presence or absence of the position controlling portion; to further provide in the power supplying apparatus setting portion detecting means for detecting presence or absence of the setting portion, and identifying means for identifying the power supplying mode in correspondence with a detection result obtained by the setting portion detecting means; and to make the power supplying means supply power to the charging/discharging apparatus in the matched power supplying mode when the power supplying mode received by the receivable power supplying mode receiving means matches with the power supplying mode identified by the identifying means.

A power supplying method of the second power supplying system of the present invention is characterized in that the charging/discharging method of the charging/discharging apparatus comprises a receivable power supplying mode storing step for storing the information showing a receivable power supplying mode, and a transmitting step for transmitting the information showing the power supplying mode stored by the processing in the receivable power supplying mode storing step to the power supplying apparatus; and the power supplying method of the power supplying apparatus comprises a receivable power supplying mode receiving step for receiving the information showing a receivable power a receivable power supplying mode from the charging/discharging apparatus and a power supplying step for supplying power to the charging/discharging apparatus in correspondence with the power supplying mode received through the processing in the receivable power supplying mode receiving step.

A program in a fourth program storing medium of the present invention is characterized in that the program for controlling the charging/discharging apparatus comprises a receivable power supplying mode storage controlling step for controlling storage of the information showing a receivable power supplying mode, and a transmission controlling step for controlling transmission processing of the information showing the power supplying mode stored through the processing in the receivable power supplying mode storage controlling step; and the program for controlling the power supplying apparatus comprises a receivable power supplying mode reception controlling step for controlling reception of the information showing a receivable power supplying mode from said charging/discharging apparatus, and a power supply controlling step for controlling supply of power to the charging/discharging apparatus in correspondence with the power supplying mode received through the processing in the receivable power supplying mode reception controlling step.

A fourth program of the present invention is characterized by making the computer which controls the charging/discharging apparatus execute a receivable power supplying mode storage controlling step for controlling storage of the information showing a receivable power supplying mode, and a transmission controlling step for controlling transmission processing of the information showing the power supplying mode stored through the processing in the receivable power supplying mode storage controlling step to the power supplying apparatus; and making a computer which controls the power supplying apparatus execute a receivable power supplying mode reception controlling step for controlling reception of the information showing receivable power supplying mode from the charging/discharging apparatus, and a power supply controlling step for controlling supply of power to the charging/discharging apparatus in correspondence with the power supplying mode received through the processing in the receivable power supplying mode reception controlling step.

A third charging/discharging apparatus of the present invention is characterized by comprising temperature measuring means for measuring an own internal temperature; and transmitting means for transmitting the internal temperature data measured by the temperature measuring means to the power supplying apparatus.

A charging/discharging method of the third charging/discharging apparatus of the present invention is characterized by comprising a temperature measuring step for measuring an own internal temperature; and a transmitting step for transmitting the internal temperature data measured in the temperature measuring step to the power supplying apparatus.

A program in a fifth program storing medium of the present invention is characterized by comprising a temperature measurement controlling step for controlling an own internal temperature, and a transmission controlling step for controlling transmission processing of the internal temperature data measured in the temperature measurement controlling step to the power supplying apparatus.

A fifth program of the present invention is characterized by executing a temperature measurement controlling step for controlling measurement of an own internal temperature, and a transmission controlling step for controlling transmission processing of the internal temperature data measured in the temperature measurement controlling step to the power supplying apparatus.

A third power supplying apparatus of the present invention is characterized by comprising receiving means for receiving internal temperature data of the charging/discharging apparatus transmitted from the charging/discharging apparatus, temperature measuring means for measuring an own internal temperature, and power supplying mode changing means for changing power supplying modes of the power to be supplied to a charging/discharging apparatus based on the internal temperature data of the charging/discharging apparatus received by the receiving means or the own temperature data measured by the temperature measuring means.

It is possible to make the power supplying mode changing means change the current mode to a power supplying mode which supplies power at a small current when the internal temperature data of the charging/discharging apparatus received by the receiving means are out of a predetermined preset temperature range.

It is possible to make the power supplying mode changing means stop the supply of power when the temperature data measured by temperature measuring means are out of a predetermined preset temperature range.

A third power supplying method of the present invention is characterized by comprising a receiving step for receiving internal temperature data of the charging/discharging apparatus transmitted from the charging/discharging apparatus, a temperature measuring step for measuring an own internal temperature, and power supplying modes changing step for changing power supplying modes of the power to be supplied to the charging/discharging apparatus based on the internal temperature data of the charging/discharging apparatus received through the processing in the receiving step or the own temperature data measured through the processing in the temperature measurement controlling step.

A program in a sixth program storing medium of the present invention is characterized by comprising a reception controlling step for controlling reception of internal temperature data of the charging/discharging apparatus transmitted from the charging/discharging apparatus, a temperature measurement controlling step for controlling measurement of an own internal temperature, and a supplying mode change controlling step for controlling change of power supplying modes of the power to be supplied to the charging/discharging apparatus based on the internal temperature data of the charging/discharging apparatus received through the processing in the reception controlling step or the own temperature data measured through the processing in the temperature measurement controlling step.

A sixth program of the present invention is characterized by executing a reception controlling step for controlling reception of internal temperature data of the charging/discharging apparatus transmitted from the charging/discharging apparatus, a temperature measurement controlling step for controlling measurement of an own internal temperature, and a power supplying mode change controlling step for controlling change of power supplying modes of the power to be supplied to the charging/discharging apparatus based on the internal temperature data of the charging/discharging apparatus received through the processing in the reception controlling step or the own temperature data measured through the processing in the temperature measurement controlling step.

A third power supplying system of the present invention is characterized in that the charging/discharging apparatus is provided with charging/discharging apparatus temperature measuring means for measuring an internal temperature of the charging/discharging apparatus, and transmitting means for transmitting the internal temperature data of the charging/discharging apparatus measured by the charging/discharging apparatus temperature measuring means to the power supplying apparatus; and the power supplying apparatus is provided with receiving means for receiving the internal temperature data of the charging/discharging apparatus transmitted from the charging/discharging apparatus, power supplying apparatus temperature measuring means for measuring an internal temperature of said power supplying apparatus, and power supplying mode changing means for changing power supplying modes of the power to be supplied to the charging/discharging apparatus in accordance with the internal temperature data of the charging/discharging apparatus received by the receiving means or the internal temperature data of the power supplying apparatus measured by the power supplying apparatus temperature measuring means.

It is possible to make the power supplying mode changing means change the present mode to a power supplying mode which supplies power at a small current when the internal temperature data of the charging/discharging apparatus received by the receiving means are out of a predetermined preset temperature range.

It is possible to make the power supplying mode changing means stop the supply of power when the temperature data measured by the power supplying apparatus temperature measuring means are out of a predetermined preset temperature range.

A power supplying method of the third power supplying system of the present invention is characterized in that the charging/discharging method of the charging/discharging apparatus comprises a charging/discharging apparatus temperature measuring step for measuring an internal temperature of the charging/discharging apparatus, and a transmitting step for transmitting the internal temperature data of the charging/discharging apparatus measured through the processing in the charging/discharging apparatus temperature measuring step to the power supplying apparatus; and the power supplying method of the power supplying apparatus comprises a receiving step for receiving the internal temperature data of the charging/discharging apparatus transmitted from the charging/discharging apparatus, and a power supplying mode changing step for changing power supplying modes of the power to be supplied to the charging/discharging apparatus based on the internal temperature data of the charging/discharging apparatus received through the processing in the receiving step or the internal temperature data of the power supplying apparatus measured through the processing in the power supplying apparatus temperature measuring step.

A program of a seventh program storing medium of the present invention is characterized in that the program for controlling the charging/discharging apparatus comprises a charging/discharging apparatus temperature measurement controlling step for controlling the internal temperature measurement of the charging/discharging apparatus, and a transmission controlling step for controlling transmission processing of the internal temperature data of the charging/discharging apparatus measured through the processing in said charging/discharging apparatus temperature measurement controlling step to the power supplying apparatus; and the program for controlling the power supplying apparatus c comprises a reception controlling step for controlling reception of the internal temperature data of the charging/discharging apparatus transmitted from the charging/discharging apparatus, a power supplying apparatus temperature measurement controlling step for controlling measurement of the internal temperature of the power supplying apparatus, and a power supplying mode change controlling step for controlling change of power supplying modes of the power to be supplied to the charging/discharging apparatus in accordance with the internal temperature data of the charging/discharging apparatus received through the processing in the reception controlling step or the internal temperature data of the power supplying apparatus measured through the processing in the power supplying apparatus temperature measurement controlling step.

A seventh program of the present invention is characterized by making a computer which controls the charging/discharging apparatus execute a charging/discharging apparatus temperature measurement controlling step for controlling measurement of the internal temperature of the charging/discharging apparatus, and a transmission controlling step for controlling transmission processing of the internal temperature data of the charging/discharging apparatus to the power supplying apparatus; and making the computer which controls the power supplying apparatus execute a reception controlling step for controlling reception of the internal temperature data of the charging/discharging apparatus transmitted from the charging/discharging apparatus, a power supplying apparatus temperature measurement controlling step for controlling measurement of the internal temperature of the power supplying apparatus, and a power supplying mode change controlling step for controlling change of power supplying modes of the power to be supplied to the charging/discharging apparatus based on the internal temperature data of the charging/discharging apparatus received through the processing in the reception controlling step or the internal temperature data of the power supplying apparatus measured through the processing in the power supplying apparatus temperature measurement controlling step.

In case of the first charging/discharging apparatus of the present invention, a relative position with a power supplying apparatus is controlled such that a receiving terminal for receiving power from a power supplying apparatus connects with a supplying terminal for the power supplying apparatus to supply power and a receivable power supplying mode is set.

In case of the first power supplying apparatus, method and the first program of the present invention, presence or absence of a setting portion is detected, a power supplying mode is identified in accordance with the detection result, and power is supplied to a charging/discharging apparatus from a supplying terminal in an identified power supplying mode.

In case of the first power supplying system of the present invention, a relative position to a power supplying apparatus is controlled such that a receiving terminal for receiving power from a power supplying apparatus connects with a supplying terminal for the power supplying apparatus to supply power, a receivable power supplying mode is set, presence or absence of a setting portion is detected, a power supplying mode is identified in accordance with the detection result, and power is supplied to the charging/discharging apparatus from the supplying terminal in an identified power supplying mode.

In case of the second charging/discharging apparatus, method and the second program of the present invention, the information showing a receivable power supplying mode is stored and the information showing the stored power supplying mode is transmitted to a power supplying apparatus.

In case of the second power supplying apparatus and method and the third program of the present invention, the information showing a receivable power supplying mode is received from a charging/discharging apparatus and power is supplied to the charging/discharging apparatus in correspondence with a received power supplying mode.

In case of the second power supplying system and a power supplying method of the second power supplying system, and the fourth program of the present invention, the information showing a receivable power supplying mode is stored by a charging/discharging apparatus, the information showing the stored power supplying mode is transmitted to a power supplying apparatus, the information showing the receivable power supplying mode output from the charging/discharging apparatus is received by the power supplying apparatus, and power is supplied to the charging/discharging apparatus in correspondence with a received power supplying mode.

In case of the third charging/discharging apparatus, method and the fifth program of the present invention, an own internal temperature of its own is measured and the measured internal temperature is transmitted to a power supplying apparatus.

In case of the third power supplying apparatus and method and the sixth program of the present invention, the internal temperature data of a charging/discharging apparatus transmitted from the charging/discharging apparatus is received, an own internal temperature is measured, and power supplying modes of the power to be supplied to the charging/discharging apparatus are changed in accordance with the received internal temperature data of the charging/discharging apparatus or the measured own internal temperature data.

In case of the third power supplying system, a power supplying method of the third power supplying system, and the seventh program of the present invention, the internal temperature of a charging/discharging apparatus is measured by the charging/discharging apparatus, the measured internal temperature data of the charging/discharging apparatus are transmitted to a power supplying apparatus, the internal temperature data of the charging/discharging apparatus transmitted from the charging/discharging apparatus are received by the power supplying apparatus, the internal temperature of the power supplying apparatus is measured, and power supplying modes of the power which supplies to the charging/discharging apparatus are changed based on the received internal temperature data of the charging/discharging apparatus or the measured internal temperature data of the power supplying apparatus.

BRIEF DESCRIPTION OF THE DRAWINGS

FIG. 20 is a view showing a third electrical configuration of a SQ battery pack and a battery charger;

FIG. 21 is a flowchart for explaining the charging control processing by a battery charger;

BEST MODE FOR CARRYING OUT THE INVENTION

Figure 1:
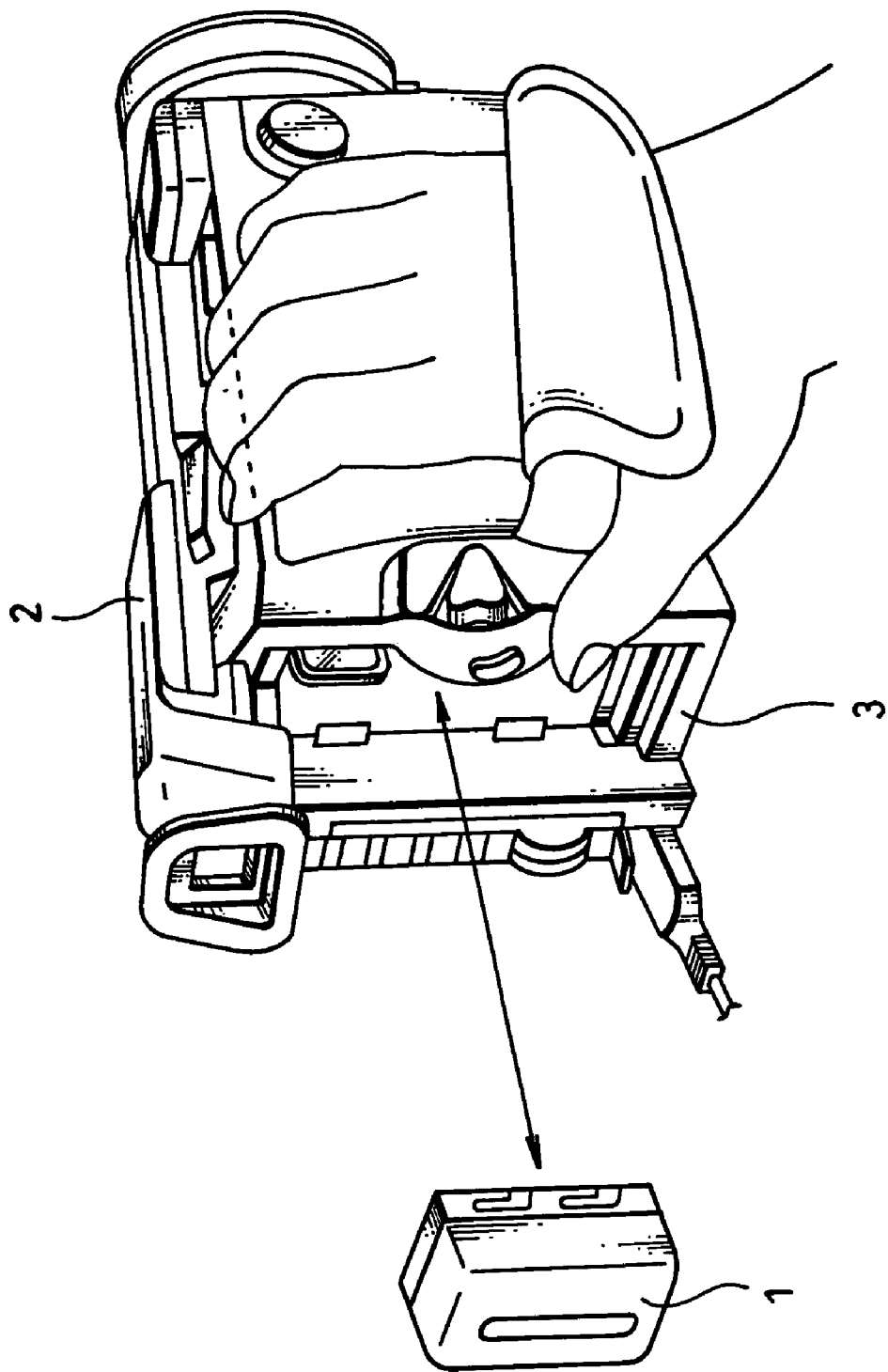
FIG. 1 is a view for explaining a SQ battery pack to which the present invention is applied.

FIG. 1 is a view showing a configuration of an embodiment of a SQ (Super Quick) battery pack 1 of the present invention. The SQ battery pack 1 is set to a battery attaching portion 3 of a video camera 2. The SQ battery pack 1 is attached to the battery attaching portion 3 of the video camera 2 to supply power to the video camera 2. Moreover, with reference to FIG. 5, the SQ battery pack 1 is constituted such that it can be attached to a battery charger 151 to be described later, which is charged by the battery charger 151. Moreover, a conventional battery pack 11 (FIG. 4) can be set to the battery attaching portion 3. The charging time of the SQ battery pack 1 is shorter than that of the conventional battery pack 11, because it can be charged at a larger current when it is charged by the battery charger 151.

Figure 2:
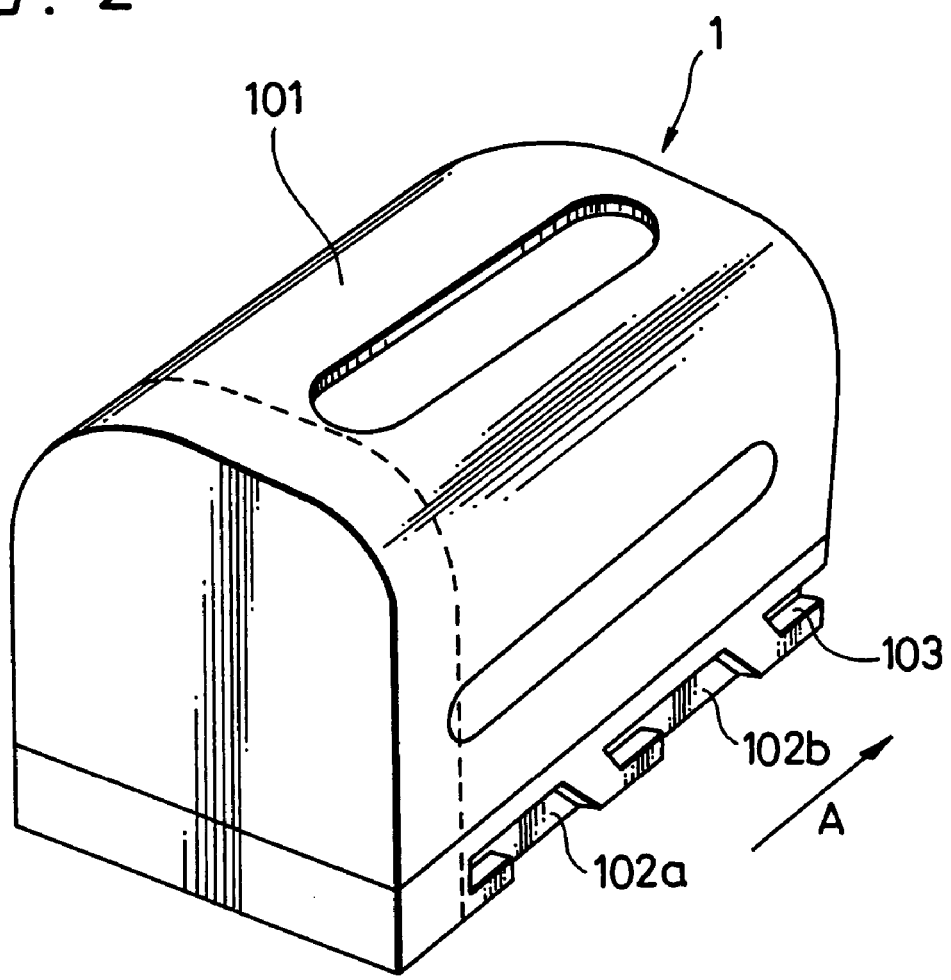
FIG. 2 is a view showing details of the SQ battery pack in FIG. 1.
Figure 12:
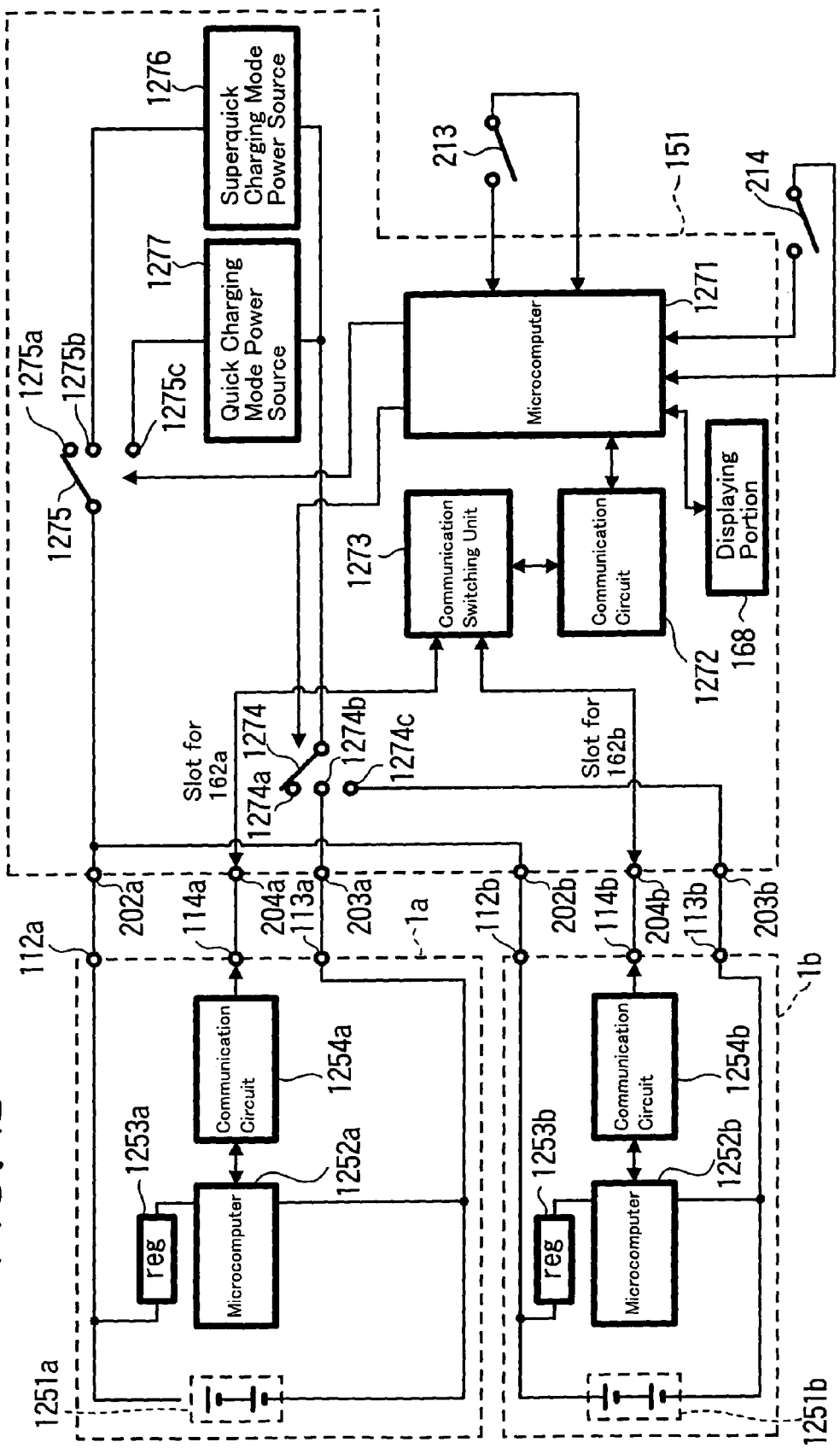
FIG. 12 is a view showing a first electrical configuration of a SQ battery pack and a battery charger.

Then, details of the SQ battery pack 1 are described below with reference to FIG. 2. As shown in FIG. 2, a case 101, which stores a battery cell 1251a or 1251b with reference to FIG. 12, is provided in the pack 1.

The case 101 of the SQ battery pack 1 is formed by a synthetic resin. Guide grooves 102a to 102d (FIG. 3) for guiding the battery attaching portion 3, or slots 162a or 162b of battery charger 151 in the attaching direction shown by the arrow A in FIG. 2 are formed on the width directional both side faces of the case 101. In FIG. 2, only the guide grooves 102a and 102b are shown.

In the following description, the guide grooves 102a to 102d are referred to as the guide 102 when it is not necessary to individually distinguish the guide grooves 102a to 102d. The same is applied to other configurations.

Figure 3:
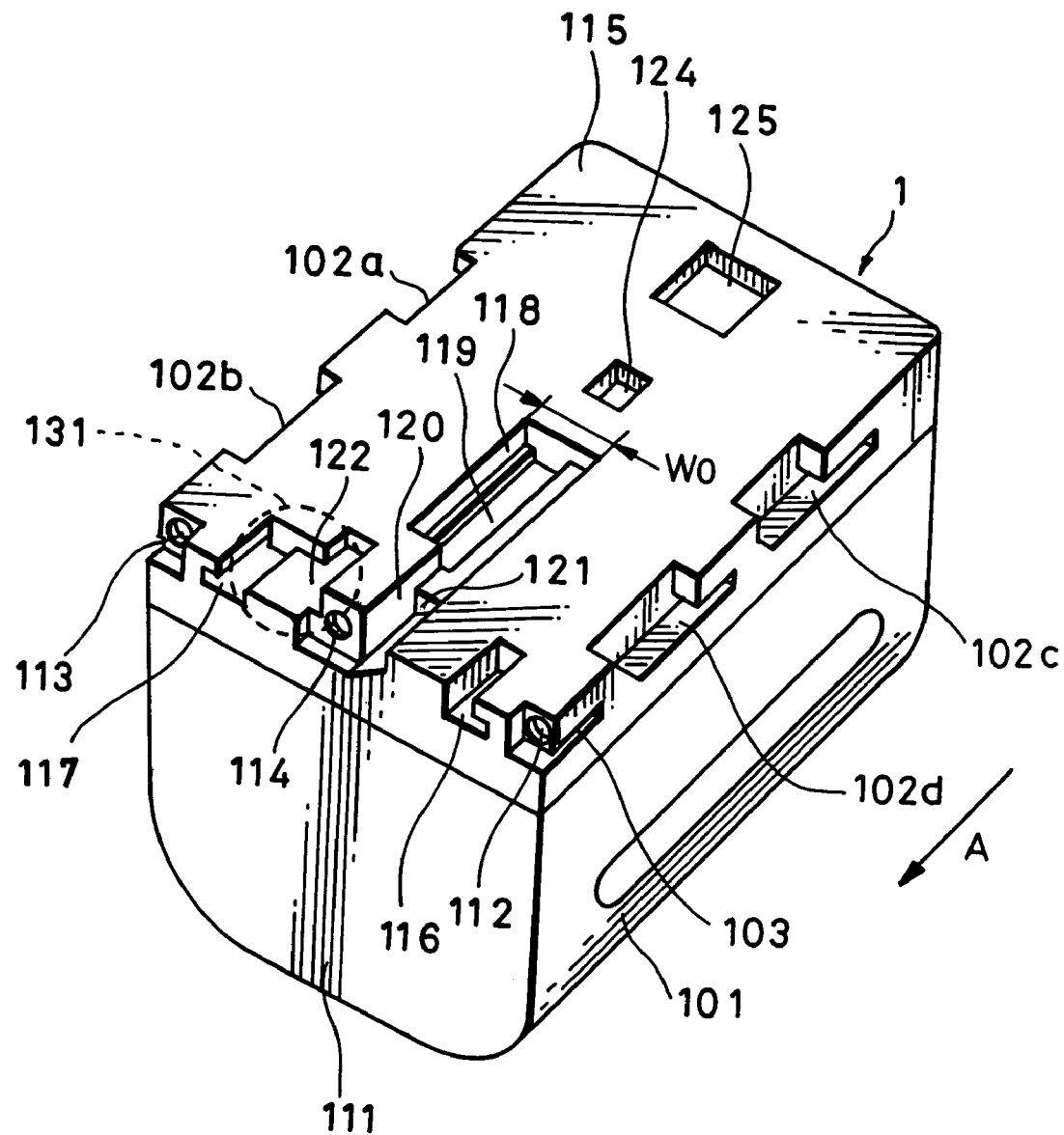
FIG. 3 is a view showing details of the SQ battery pack in FIG. 1.

As shown in FIG. 3, each guide groove 102 on each side face is formed while one end of the groove 102 is opened on the bottom 115 of the case 101 and formed in the longitudinal direction of the case 101 in parallel.

Input/output terminals 112 and 113 are formed at the width directional both sides of the case 101 at the front portion 111 shown by the direction of the arrow A in FIG. 3 to the battery attaching portion 3 or a slot 162 of the battery charger 151 and a communication terminal 114 is attached to the approximate center in the width direction.

The input/output terminals 112 and 113 receive power from the battery charger 151. The communication terminal 114 communicates the information such as the charging capacities or other information related to the battery charger 151 and SQ battery pack 1. Outward one ends of the input/output terminals 112 and 113 and communication terminal 114 are located in an approximately rectangular concave portion formed at the front portion 111 of the case 101. Therefore, the battery attaching portion 3 or the battery charger 151 is prevented from being broken due to the contact with a portion other than each connection terminal.

A pair of controlling concave portions 116 and 117 are formed on the front portion in the setting direction (front portion in longitudinal direction) shown by the arrow A in FIG. 3 at the bottom 115 of the case 101. As shown in FIG. 3, these controlling concave portions 116 and 117 are formed so as to be line symmetric to the approximate center line (not illustrated) in the transverse direction. For setting, these controlling concave portions 116 and 117 are engaged with controlling convex portions 206 and 207 of the battery charger 151 (FIG. 7) to control the width directional tilt of the bottom 115 of the case 101 from the slots 162.

As shown in FIG. 3, the controlling concave portions 116 and 117 are respectively provided with a first portion formed perpendicularly to the bottom 115 of the case 101 and a second portion formed perpendicularly to the first portion and whose cross sections are respectively formed like L shape. Moreover, an approximately rectangular identifying concave portion 118 for identifying the adaptive slot 162 is formed at the approximate center of the bottom 115 of the case 101.

As shown in FIG. 3, the identifying concave portion 118 is formed on the approximate center line of the case 101 in its width direction and located at the front portion 111 at the approximate center of the bottom 115 of the case 101. An approximately rectangular identifying groove 119 is continuously formed at the longitudinal directional both ends on the approximate width directional center line of the case 101 at the bottom of the inside of the identifying concave portion 118. A stepped portion is formed at the width directional both sides of the bottom 115 of the case 101 in the identifying concave portion 118.

The dimension of the width-directional both sides of the identifying concave portion 118 is formed at the dimension width WO (WO is a predetermined dimension).

Moreover, a guide groove 120 adjacent to the communication terminal 114 is formed in parallel with the longitudinal direction of the case 101. One end of the guide groove 120 opens at the front portion 111 of the case 101 and the other end of it is formed by being continued with the identifying concave portion 118. Stepped portions 121 different from each other in depth are formed on the guide groove 120 in the direction perpendicular to the bottom 115 of the case 101 at the position adjacent to the front portion 111 of the case 101. The guide groove 120 guides the SQ battery pack 1 in the setting direction shown by the arrow A to the slot 162 of the battery charger 151.

As shown in FIG. 3, a guide groove 122 is formed at the position opposite to the guide groove 120 at the both sides of the communication terminal 114. The guide groove 122 is formed in parallel with the longitudinal direction of the bottom 115 of the case 101 and one end of the groove 122 opens at the front portion 111 of the case 101.

A controlling groove 103 (though not illustrated, another groove 103 is also formed at the same position of the left side face of the front portion 111) adjacent to the input/output terminals 112 and 113 is formed at the width directional both side faces of the case 101. The controlling groove 103 opens at the front portion 111 and is formed in approximately parallel with the bottom 115 to control the width directional tilt of the bottom 115 from the slots 162.

A small locking concave portion 124 and a large locking concave portion 125 to be engaged with the slot 162 are formed on the bottom 115 of the case 101 when the bottom 115 is attached to the battery charger 151. The small locking concave portion 124 is formed into an approximate rectangle on the approximate center line of the case 101 in its width direction so as to be adjacent to the identifying concave portion 118. The large locking concave portion 125 is formed into an approximate rectangle slightly larger than the small locking concave portion 124 at the back side in the attaching direction on the approximate center line of the case 101 in its width direction.

Figure 4:
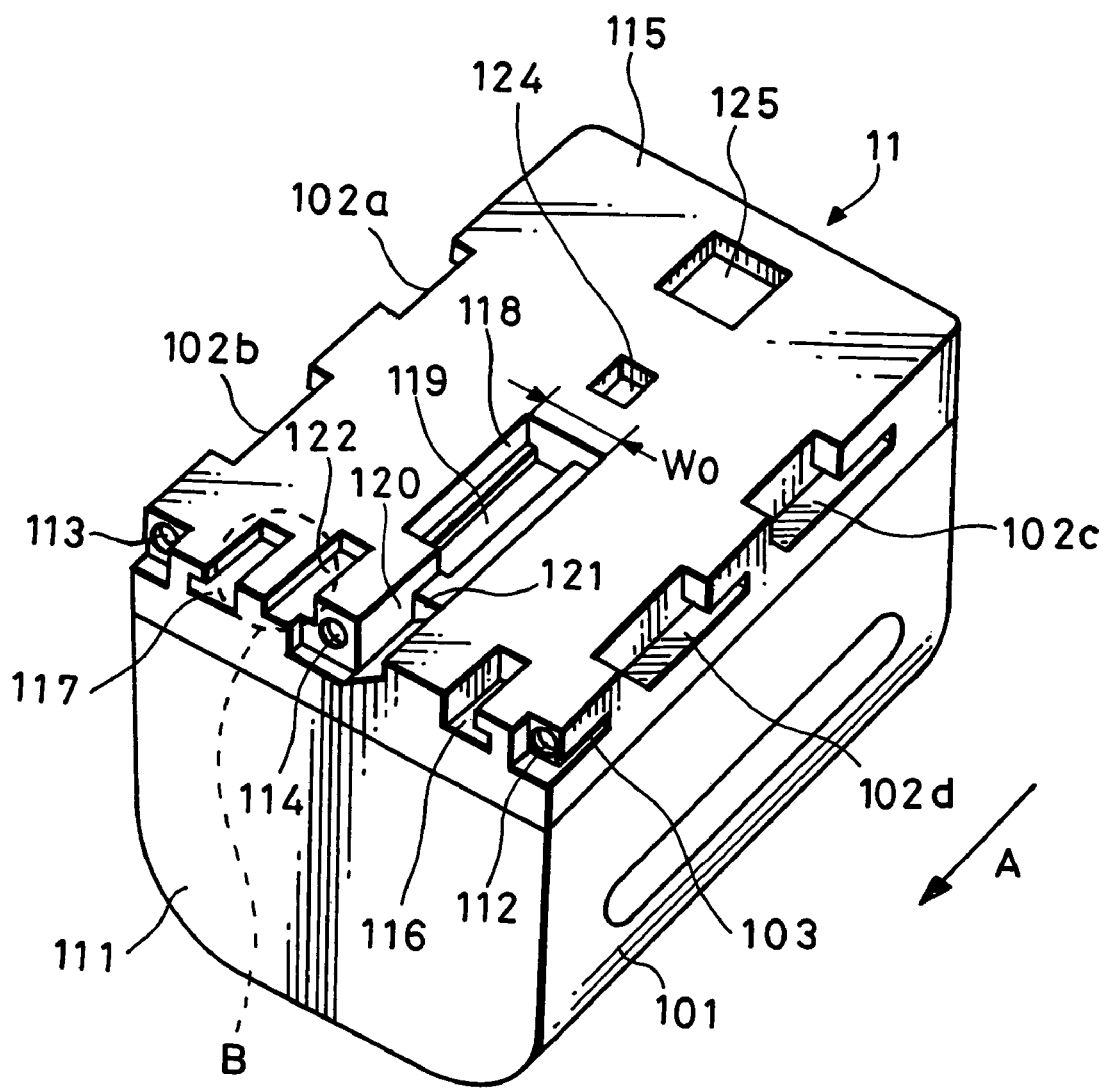
FIG. 4 is a view showing details of a conventional battery pack.

A type of battery pack deciding concave portion 131 serves as a concave portion for identifying the SQ battery pack 1 and the battery pack 11 when the portion 131 is attached to the slot 162 of the battery charger 151. As shown in FIG. 4, in case of the type of battery pack deciding concave portion 131, a concave portion is formed on the portion shown by B of the conventional battery pack 11 in FIG. 4 by the same depth as the guide groove 122 and the same length as the longitudinal direction of the controlling portion 117 when viewed from the bottom 115. That is, the type of battery pack deciding concave portion 131 has a configuration in which a part of the bottom 115 of the conventional battery pack 11 is cut out. Because the difference between shapes of the conventional battery pack 11 and SQ battery pack 1 lies in only presence or absence of the type of battery pack deciding concave portion 131, other description is omitted.

Figure 5:
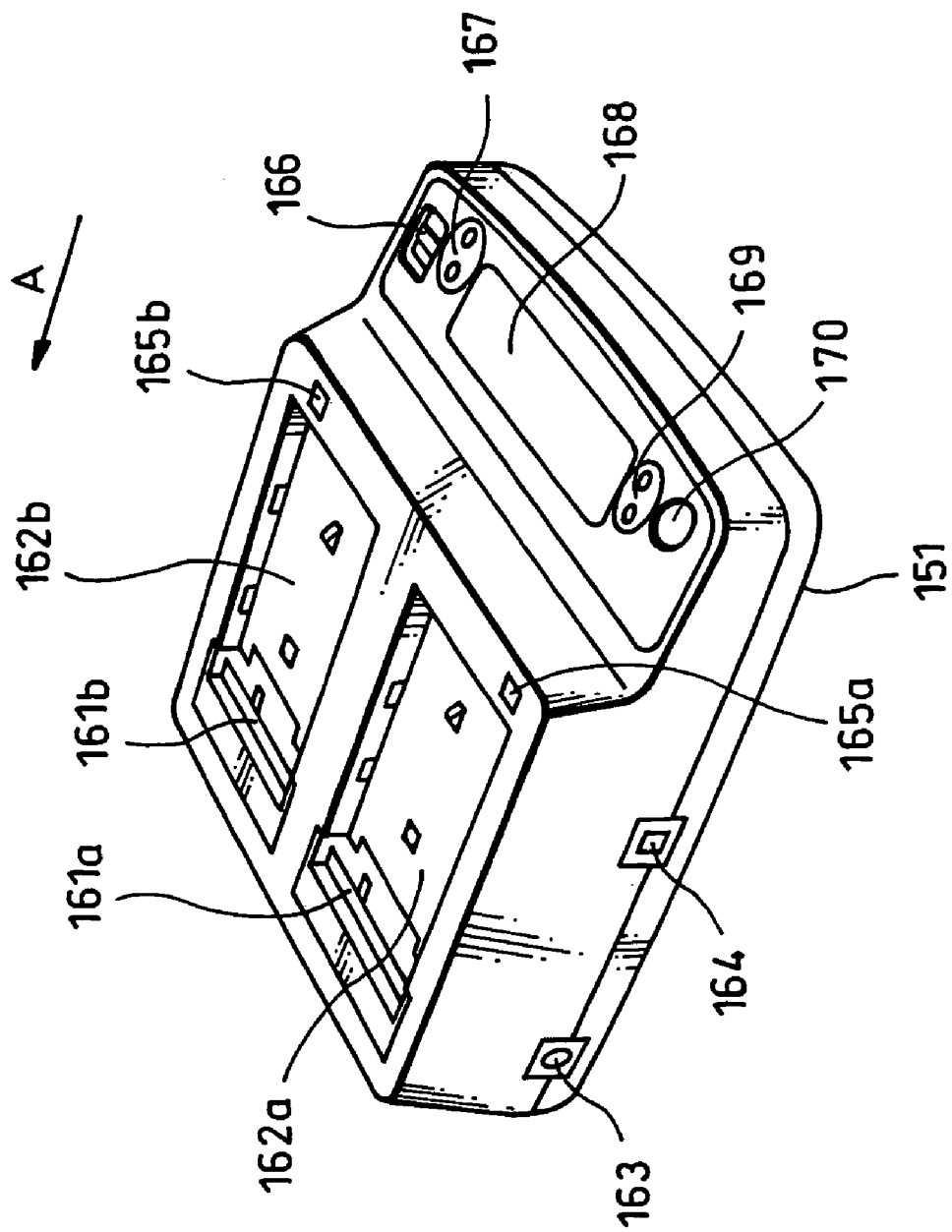
FIG. 5 is a view showing a configuration of a battery charger.

Then, the configuration of the battery charger 151 is described below with reference to FIG. 5.

It is possible to attach two battery packs to the battery charger 151. Moreover, terminal shutters 161a and 161b of the battery charger 151 are flat. Therefore, when the SQ battery pack 1 or the battery pack 11 is not attached, the shutters 161a and 161b are pushed out in the direction opposite to the direction of the arrow A in FIG. 5 due to the repulsion of a not illustrated spring built in the body of the battery charger 151 and fixed at a predetermined length to cover terminal portions of the battery charger 151 to be described later. Moreover, when the SQ battery pack 1 or battery pack 11 is attached along the slot 162 and the terminal shutters 161 are pushed against the repulsion of a not illustrated spring by the front portion 111, the shutters 161 slide in the direction of the arrow A in FIG. 5 and are stored in the body of the battery charger 151. Thus, because the terminal shutters 161 are stored, the terminal portion of the battery charger 151 is exposed and moreover, the SQ battery pack 11 or battery pack 1 is attached (connected). Details of the slot 162 will be described later.

A DC (Direct Current) input terminal 163 is a terminal to which a not illustrated cable for supplying power to the battery charger 151 is attached and rated power is supplied. A DC output terminal 164 is a terminal to which a not illustrated cable for outputting the power supplied from the DC input terminal 163 to a video camera 2 is attached and which outputs the power at a voltage value and a current value corresponding to the video camera 2.

Charging lamps 165a and 165b are lamps for respectively showing a battery pack currently supplying (charging) power among the battery packs attached to the slots 162a and 162b and are turned on at the slot 162 supplying power.

A mode changing switch 166 is a switch for changing operation modes of the battery charger 151 and selecting either of the mode to output to a video camera set to the DC output terminal 164 and the mode to charge a battery pack attached to the slots 162.

A charging mode lamp 167 shows two modes while the battery charger 151 performs charging. One of them is a quick charging mode for charging the conventional battery pack 11 and the other of them is a superquick charging mode for charging the SQ battery pack 1. The superquick charging mode is a mode to quickly perform charging at a large current compared to the case of the quick charging mode.

A display portion 168 is constituted of a LCD (Liquid Crystal Display) or the like to display a charged state or other information.

Figure 6:
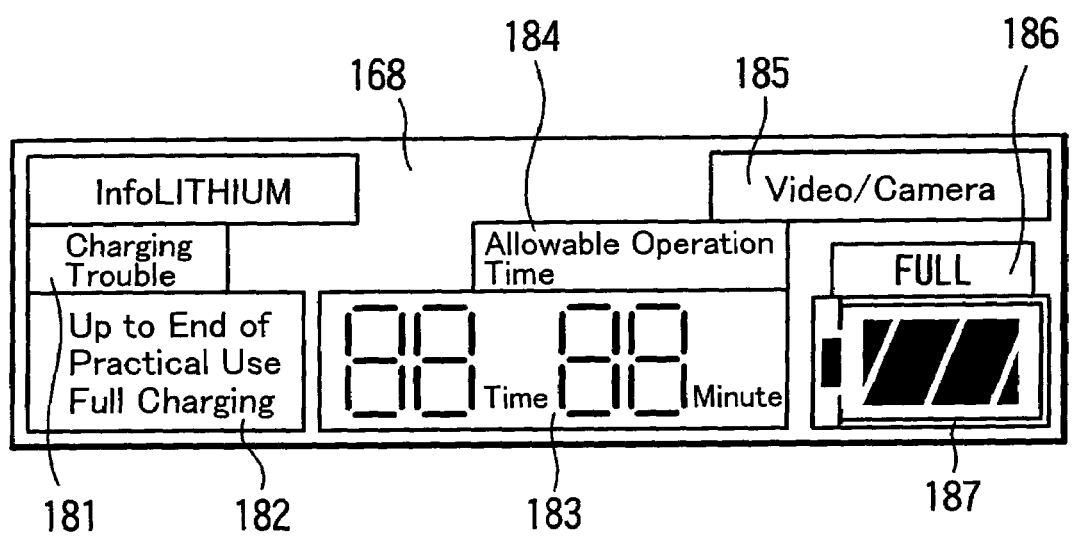
FIG. 6 is a view for explaining the displaying portion in FIG. 5.

FIG. 6 shows details of the displaying portion 168. FIG. 6 shows a state in which all portions which can be displayed as an LCD are displayed. Therefore, a part of the display in FIG. 6 is actually displayed.

A charging trouble displaying portion 181 is a portion showing "charging trouble" located at the top left of the displaying portion 168, which is displayed when a trouble is detected in the set SQ battery pack 1 or battery pack 11 while it is charged.

A remaining charging time displaying portion 182 displays a remaining charging time, on which a message "up to end of practical use charging" is displayed when showing a practical use charged state, that is, the time up to an operable charged state, a message "up to end of full charging" when showing the charging time until completely charged in the display "up to end of practical use full charging" and in this case, the time up to end of each charging is displayed on a time displaying portion 183.

An allowable operation time displaying portion 184 is displayed when displaying the allowable operation time of the SQ battery pack 11 or battery pack 11 and in this case, a corresponding allowable operation time is displayed on the time displaying portion 183.

A video camera displaying portion 185 is displayed in a mode in which power is supplied to the video camera 2 by the mode changing switch 166.

A full charge displaying portion 186 is displayed when the attached SQ battery pack 1 or battery pack 11 is fully charged (charging capacity of 100%). A battery mark 187 displays a charged state of the SQ battery pack 1 or battery pack 11, in which a displayed portion increases as the current charged state approaches a fully charged state and the displayed portion decreases when a charged capacity is small.

The battery charger 151 in FIG. 5 is described below again.

A charge slot displaying lamp 169 is constituted of two lamps showing the slots 162a and 162b respectively and is a lamp showing that the displaying portion 168 shows the information on an attached battery pack.

A display changing button 170 is a button for changing displayed contents of the displaying portion 168 whenever the display charging button is pressed. Whenever pressing the display charging button, the displayed slot 162 is changed (change of charge slot lamp 169) and the time display up to end of charging and the allowable operation time display are changed.

Then, the detailed configuration of the slot 162 is described below with reference to FIG. 7. The slot 162a and 162b have the same configuration.

The slot 162 is formed so as to be slightly larger than the shape of the bottom 115 of the SQ battery pack 1 or battery pack 11. The slot 162 has a pair of guide convex portions 201a and 201b engaged with each guide groove 102 of the SQ battery pack 1 of battery pack 11 adjacently to a mounting face 208 at each side opposite to the width directional both sides of the SQ battery pack 1 of battery pack 11. Though not illustrated, two guide portions 201a and 201b are further provided at positions opposite to the direction vertical to the direction of the arrow A of the slots 162.

The guide convex portions 201 are inserted into the guide grooves 102 of the case 101 respectively when attaching the SQ battery pack 1 or battery pack 11. Thereby, the slot 162 guides an inserting direction by making the bottom 115 of the case 101 approximately parallel with the mounting face 208 and hold the SQ battery pack 1 or battery pack 11.

When setting the SQ battery pack 1 or battery pack 11, connection terminals 202 and 203 and a communication terminal 204 are arranged on the bumping face 205 of a slot opposite to the front portion 111. These terminals are usually covered under a state in which the terminal shutter 161 slides up to the same position as the right side in FIG. 7 where the controlling convex portions 206 and 207 become L shape in the direction opposite to the direction of the arrow A and protected from an impact or the like. FIG. 7 shows a state in which the terminal shutter 168 slides in the direction of the arrow A and is housed in the body of the battery charger 151.

The connection terminals 202 and 203 are located at the width directional both sides of the slot 162 and connected to the input/output terminals 112 and 113 of the SQ battery pack 1 or battery pack 11 respectively. The communication terminal 204 is located at the approximate center of the slot 162 in its width directions and connected to the communication terminal 114 of the battery pack 1. The connection terminals 202 and 203 and the communication terminal 204 are arranged on the bumping face 205 of the slot 162 in parallel with the bottom 115 of the SQ battery pack 1 or battery pack 11 and in parallel with the longitudinal direction of the SQ battery pack 1 or battery pack 11.

Moreover, a pair of controlling convex portions 206 and 207 engaged with the controlling concave portions 116 and 117 of the SQ battery pack 1 or battery pack 11 respectively while bestriding the bumping face 205 and mounting face 208 are respectively integrally formed on the slot 162 line symmetrically to the approximate center line in the width direction.

These controlling convex portions 206 and 207 respectively have a first portion formed perpendicularly to the mounting face 208 and a second portion formed perpendicularly to the first portion and whose cross sections respectively show an approximate L shape. These controlling convex portions 206 and 207 control that the bottom 115 of the battery pack 11 is tilted from the mounting face 208 of the slot 162 in the width direction.

Moreover, a guide convex portion 210 for guiding the inserting direction of the SQ battery pack 1 or battery pack 11 are integrally formed at a position adjacent to the communication terminal 204 while bestriding the bumping face 205 and mounting face 208. As shown in FIG. 7, the guide convex portion 210 is formed in parallel with the longitudinal direction of the mounting face 208 at a position engaged with the guide groove 120 at the bottom 115 of the SQ battery pack 1 or battery pack 11 to be attached.

Furthermore, a guide convex portion 211 for guiding the attaching direction of the SQ battery pack 1 or battery pack 11 is formed on the slot 162 in parallel with the longitudinal direction of the mounting face 208 while bestriding the bumping face 205 and mounting face 208. The guide convex portion 211 guides the setting direction by engaging with the guide groove 122 of the SQ battery pack 1 or battery pack 11.

Furthermore, a controlling pawl 209 engaging with a controlling groove 123 is integrally protruded and formed at the width directional both sides of the slot 162 respectively. The controlling pawl 209 is formed in parallel with the mounting face 208 and the longitudinal direction of the SQ battery pack 1 or battery pack 11. Though not illustrated, one more controlling pawl 209 is formed on a face opposite to the slot 162 in the direction vertical to the direction of the arrow A.

Furthermore, an identifying convex portion 212 engaging with the identifying convex portion 118 for identifying whether the SQ battery pack 1 or battery pack 11 can be charged is integrally formed with the slot 162 at the approximate center of the mounting face 208. The identifying convex portion 212 is formed into an approximate rectangular parallelepiped. A convex piece 212a engaging with the identifying groove 119 of the SQ battery pack 1 or battery pack 11 is integrally formed at the front end of the identifying convex portion 212. Furthermore, as shown in FIG. 7, the identifying convex portion 212 is formed such that the dimension of the mounting face 208 parallel with the width direction becomes equal to a width W1 smaller than the width W0 of the identifying concave portion 118 of the SQ battery pack 1 or battery pack 11 and the portion 212 can be inserted into the identifying concave portion 118. Furthermore, the identifying convex portion 212 is formed at a position separate by a predetermined distance in the direction orthogonal to the bumping face 205.

Figure 7:
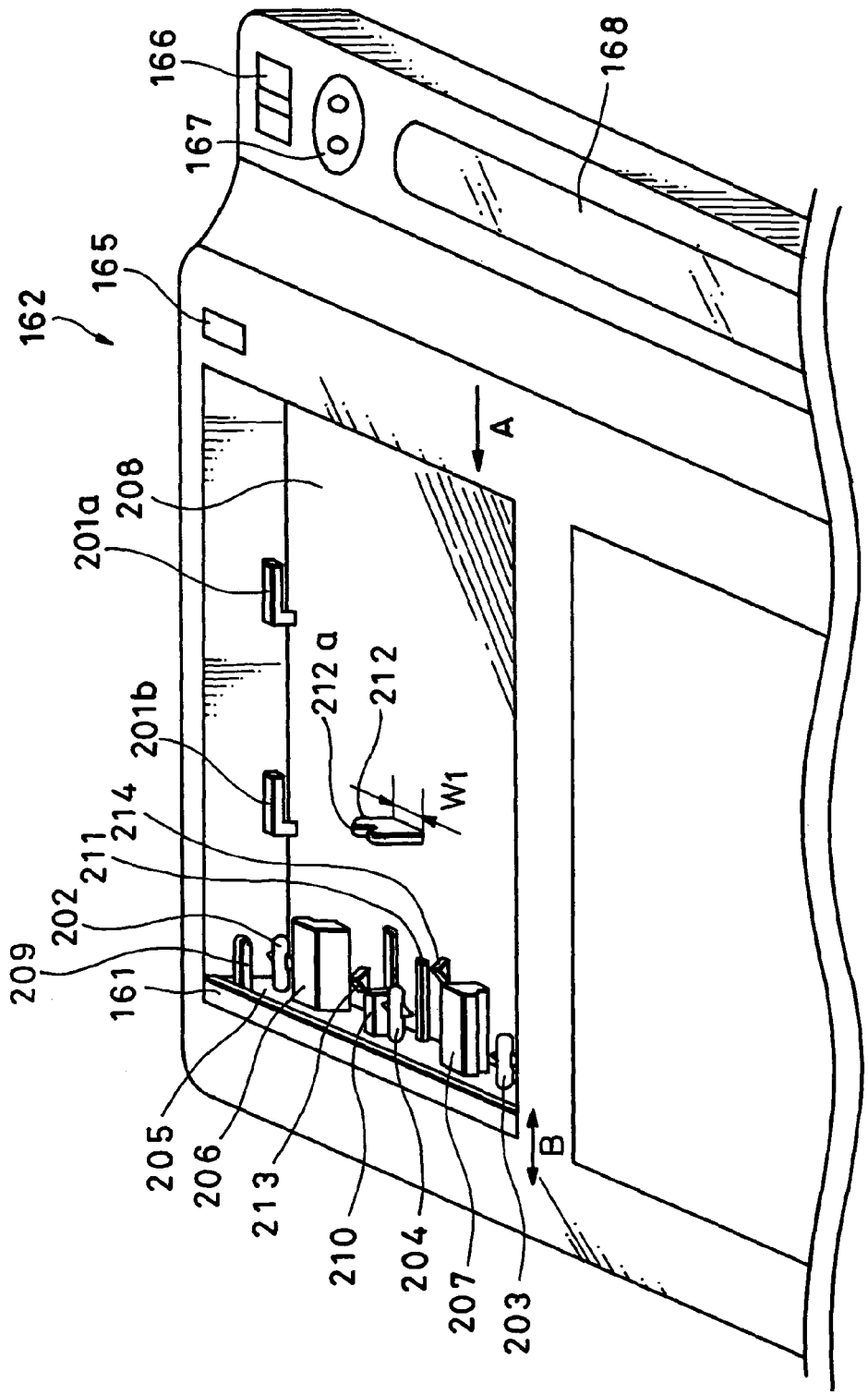
FIG. 7 is a view showing details of the slot in FIG. 5.

A charging on/off switch 213 is a spring like switch which is turned on when the SQ battery pack 1 or battery pack 11 is attached on the mounting face 208 so as to contact with the bottom 115 and pressed by the bottom 115 at a force equal to or more than the repulsion of the spring of the charging on/off switch 213 while sliding in the direction of the arrow A in FIG. 7 and outputs the start of charging to a microcomputer 1271 (FIG. 12).

Figure 8:
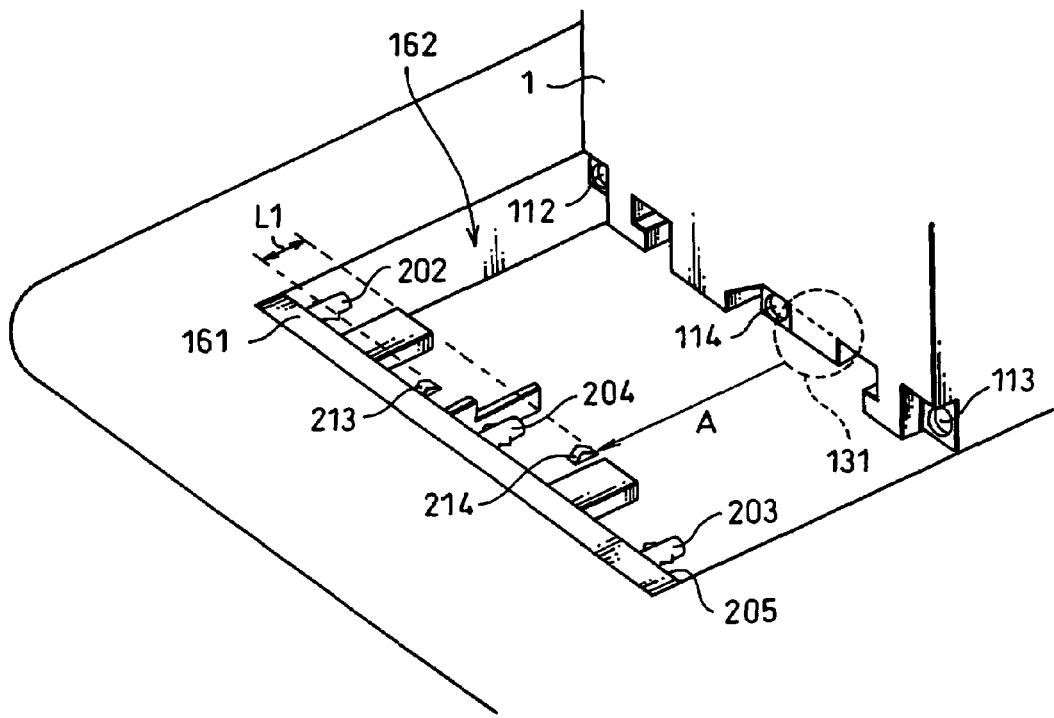
FIG. 8 is a view showing a configuration for attaching the SQ battery pack in FIG. 1 to the slot in FIG. 5.
Figure 9:
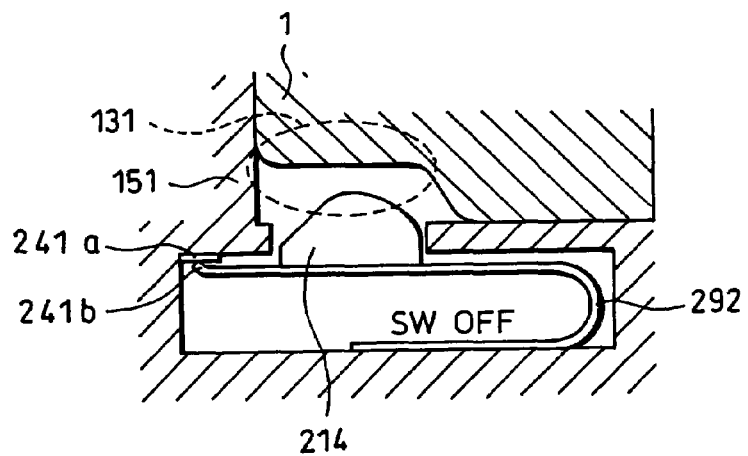
FIG. 9 is a view showing a configuration nearby the type of battery pack deciding switch in FIG. 8.

A type of battery pack deciding switch 214 is a spring like switch for identifying whether a set battery pack is the conventional battery pack 11 or SQ battery pack 1. As shown in FIG. 8, for example, when the SQ battery pack 1 is attached, the type of battery pack deciding concave portion 131 is provided for a position corresponding to the type of battery pack deciding switch 214 of the SQ battery pack 1 and because of the concave portion, the type of battery pack deciding switch 214 is not pressed by the bottom 115 of the SQ battery pack 1 as shown in FIG. 9. In this case, contact points 241a and 241b are kept contacted each other due to the upward repulsion of a spring 292, the electrically connected information is communicated to the microcomputer 1271 (FIG. 12), and thereby it is recognized that an attached battery pack is the SQ battery pack 1 under the charging to be described later. The type of battery pack deciding switch 214 decides an off state when the contact points 241a and 241b contact.

Figure 10:
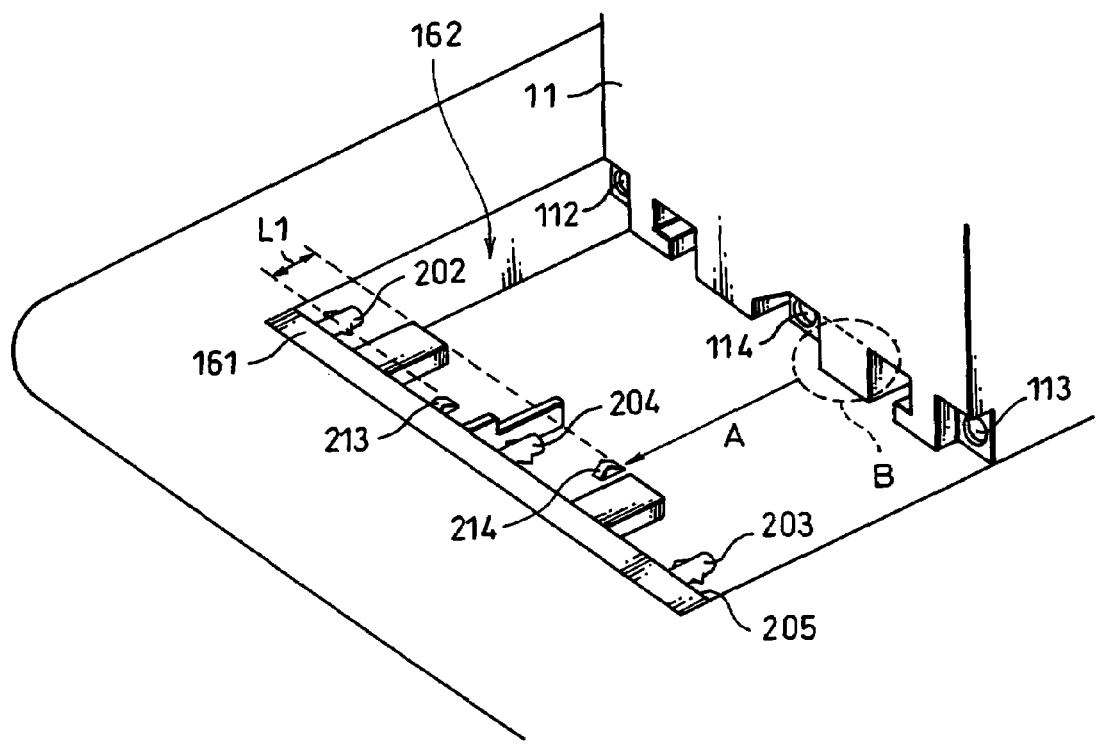
FIG. 10 is a view showing a configuration for setting the battery pack in FIG. 4 to the slot in FIG. 5.

Moreover, as shown in FIG. 10, when the conventional battery pack 11 is attached, the portion B having no concave portion shown in FIG. 4 slides to a position corresponding to the type of battery pack deciding switch 214 of the battery pack 11 in the direction of the arrow A in FIG. 10. Therefore, as shown in FIG. 1, the bottom 115 presses the type of battery pack deciding switch 214 at a force equal to or more than the upward repulsion of the spring 292 in FIG. 11. In this case, the contact points 241a and 241b become non contact state and thereby, become a not electrically connected state. When the above information is communicated to the microcomputer 1271 (FIG. 12) and thereby, it is recognized that a set battery pack is the conventional battery pack 11 under the charging to be described later. The type of battery pack deciding switch 214 decides the on state when the contact points 241a and 241b are kept in a non contact state.

Though the type of battery pack deciding switch 214 is pressed in accordance with the above configuration, the charging on/off switch 213 is also pressed in accordance with the same principle. In case of the SQ battery pack 1 and conventional battery pack 11, however, because a concave portion is not formed at a corresponding position, the SQ battery pack 1 or battery pack 11 always turn on the switch when they are attached. As shown in FIG. 8 or 10, the type of battery pack deciding switch 214 is set at a position more separate from the bumping face 205 than the charging on/off switch 213 by a distance L1. Therefore, when the battery pack 11, for example, is set, the type of battery pack deciding switch 214 is pressed earlier than the charging on/off switch 213. As a result, it is possible to discriminate the type of a battery pack before the charging on/off switch 213 is pressed and therefore the charging mode can be changed to the superquick charging mode correspondingly, so that it is possible to avoid applying a large current of the superquick charging mode which is supplied to the SQ battery pack 1 to the battery pack 11 and then to present the battery pack 11 from being broken due to an overcurrent.

Figure 11:
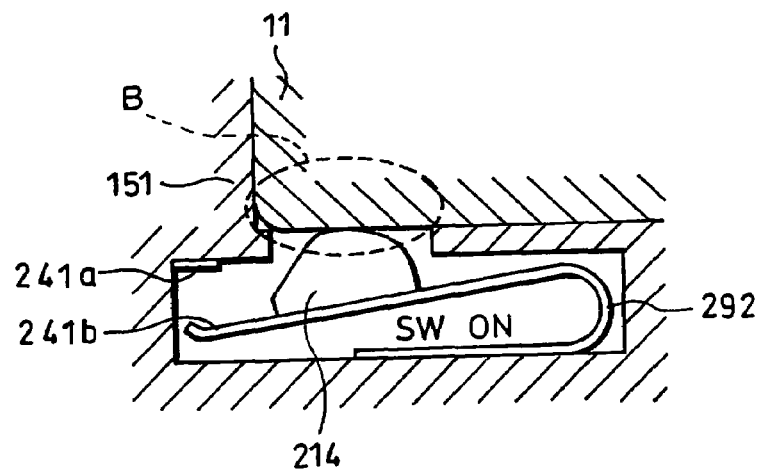
FIG. 11 is a view showing a configuration nearby the type of battery pack deciding switch in FIG. 10.

Moreover, by using the switch configuration shown in FIGS. 9 and 11, the contact points 241a and 241b may be brought into a non contact state when the spring 242 of the switch is continuously pressed against the bottom 115 of the battery pack 11 and thereby, the upward repulsion in FIG. 9 or 11 is decreased. However, even if the repulsion of the spring is decreased, the type of battery pack deciding switch 214 is always kept in the on state and thereby, the quick charging mode is always kept. Therefore, even if the conventional battery pack 11 is set, it is possible to prevent the battery pack 11 from being broken due to an overcurrent.

Since the slot 162 is constituted as described above, it is possible to attach the SQ battery pack 1 or battery pack 11 to the battery charger 151.

The battery attaching portion 3 of the video camera 2 to which the battery pack 11 is attached has the same configuration as the slot 162.

Then, an electrical configuration (first configuration) of the SQ battery pack 1 and battery charger 151 is described below with reference to FIG. 12. The SQ battery pack 1 is attached to the slots 162a and 162b in FIG. 12 and the both configurations are the same.

The battery cell 1251 of the SQ battery pack 1 is a cell for storing the power supplied from the battery charger 151 by the input/output terminals 112 and 113.

A microcomputer 1252 is constituted of a CPU (Central Processing Unit), RAM (Random Access Memory) and ROM (Read Only Memory), and driven by the power supplied through a reg (regulator) 1253. The microcomputer 1252 collects not only the charged state information of the battery cell 1251 but also various information in the SQ battery pack 1, controls a communication circuit 1254, and supplies information to the battery charger 151 through the communication terminal 114.

Though the conventional battery pack 11 has the same configuration, it cannot be charged at a large current compared to the SQ battery pack 1 because the characteristic of the battery cell 1251 is different.

Then, an electrical configuration example (first configuration) of the battery charger 151 is described below.

The microcomputer 1271 of the battery charger 151 is constituted of a CPU, a RAM and a ROM to execute various processings of the battery charger 151 and displays various information on the displaying portion 168. The communication circuit 1272 is controlled by the microcomputer 1271 to communicate with either of SQ battery packs 1a and 1b attached to the slots 162a and 162b by a communication switching unit 1273.

The charging changeover switch 1274 is controlled by the microcomputer 1271 to switch to a terminal 1274b or 1274c which corresponds to either of the slots 162a and 162b to be charged from a terminal 1274a which is a currently resting terminal at the start of charging.

A charging mode changeover switch 1275 is controlled by the microcomputer 1271 to switch to the charging mode corresponding to on or off state of the type of battery pack deciding switch 214. More specifically, the charging mode changeover switch 1275 is switched from a currently resting terminal 1275a to a terminal 1275c connected to a quick charging mode power source 1277 in case of the battery pack 11 and to a terminal 1275c connected to a superquick charging mode power source 1276 in case of the SQ battery pack 1 under charging in accordance with the type of the battery pack set to the slot 162.

Figure 13:
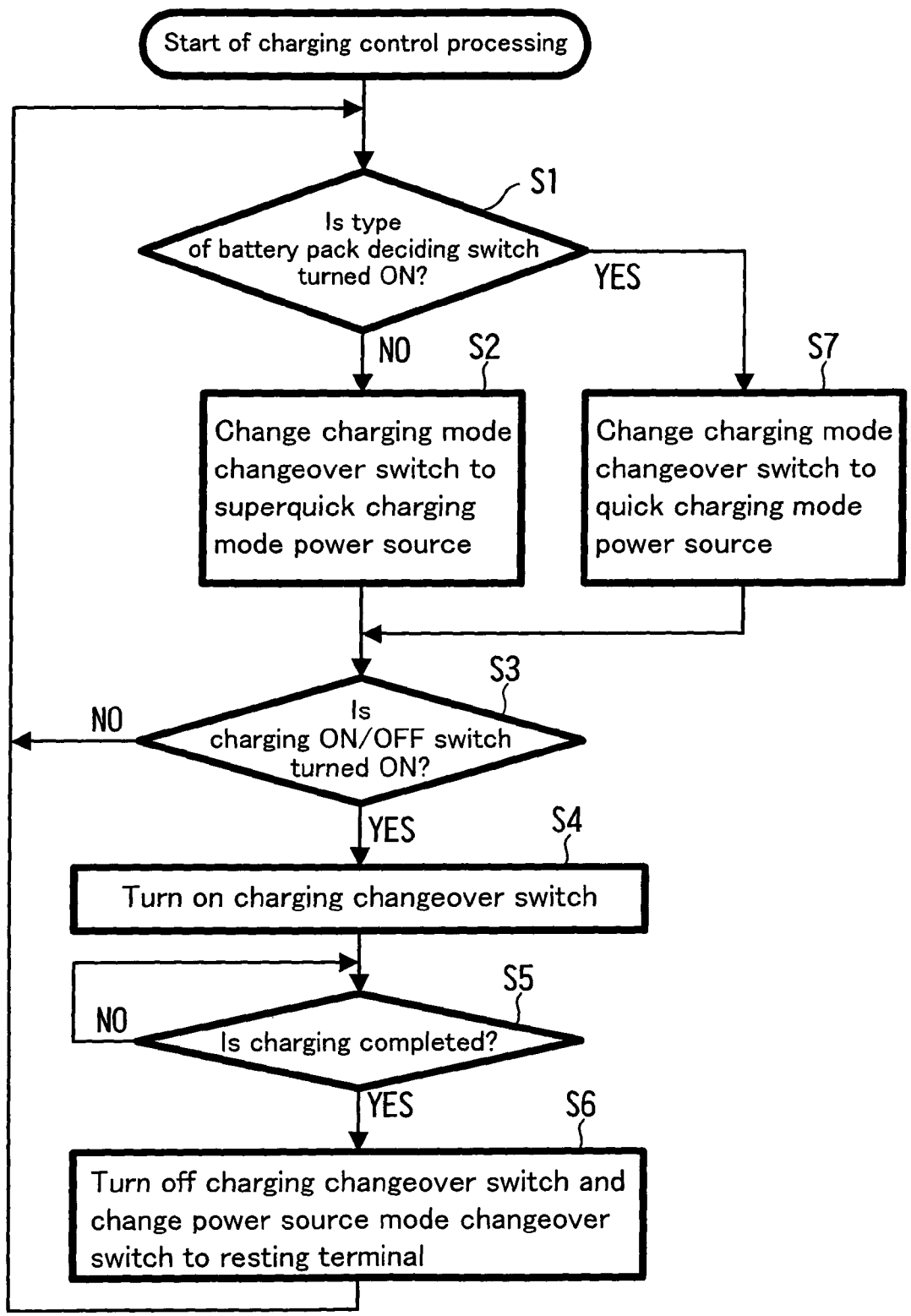
FIG. 13 is a flowchart for explaining the charging control processing by a battery charger.

Then, the charging control processing when charging the SQ battery pack 1 or battery pack 11 by setting it to the slot 162a of the battery charger 151 is described below with reference to the flowchart shown in FIG. 13.

In a step S1, the microcomputer 1271 judges whether or not the type of battery pack deciding switch 214 is turned on. When the microcomputer 1271 judges that the switch 214 is not turned on as shown in FIGS. 8 and 9, for example, the processing advances to a step S2.

In the step S2, the microcomputer 1271 regards an attached battery pack as an SQ battery pack 1 and controls the charging mode changeover switch 1275 to change from the terminal 1275a to the terminal 1275b and to the superquick charging mode power source 1276.

In a step S3, the microcomputer 1271 judges whether or not the charging on/off switch 213 is turned on. When the microcomputer 1271 judges that the switch 213 is turned on, it changes the charging changeover switch from the currently resting terminal 1274a to the terminal 1274b in a step S4 and charging the SQ battery pack 1 is started.

In a step S5, the microcomputer 1271 communicates with the microcomputer 1252 through the communication circuit 1272, the communication switching unit 1273, the communication terminals 204 and 114, and judges whether or not the charging is completed where the processing is repeated until the charging is completed. When the microcomputer judges that charging is completed, it controls the charging changeover switch 1274 such that the terminal 1274b is changed to the terminal 1274a and the charging mode changeover switch 1275 is changed from the terminal 1275b to the terminal 1275a in a step S6, and the processing returns to the step S1.

Moreover, when it is judged in the step S1 that the switch is turned on as shown in FIGS. 10 and 11, the microcomputer 1271 regards the attached battery pack as a conventional battery pack 11, controls the charging mode changeover switch such that the terminal 1275a is changed to the terminal 1275c, and repeats the subsequent processings.

In the step S3, when it is judged that the charging on/off switch 213 is not turned on, that is, it is turned off, the processing returns to the step S1 and the subsequent processings are repeated.

Alternately the same processing is performed when setting the SQ battery pack 1 or battery pack 11 to the slot 162b, so that its description is omitted.

Figure 14:
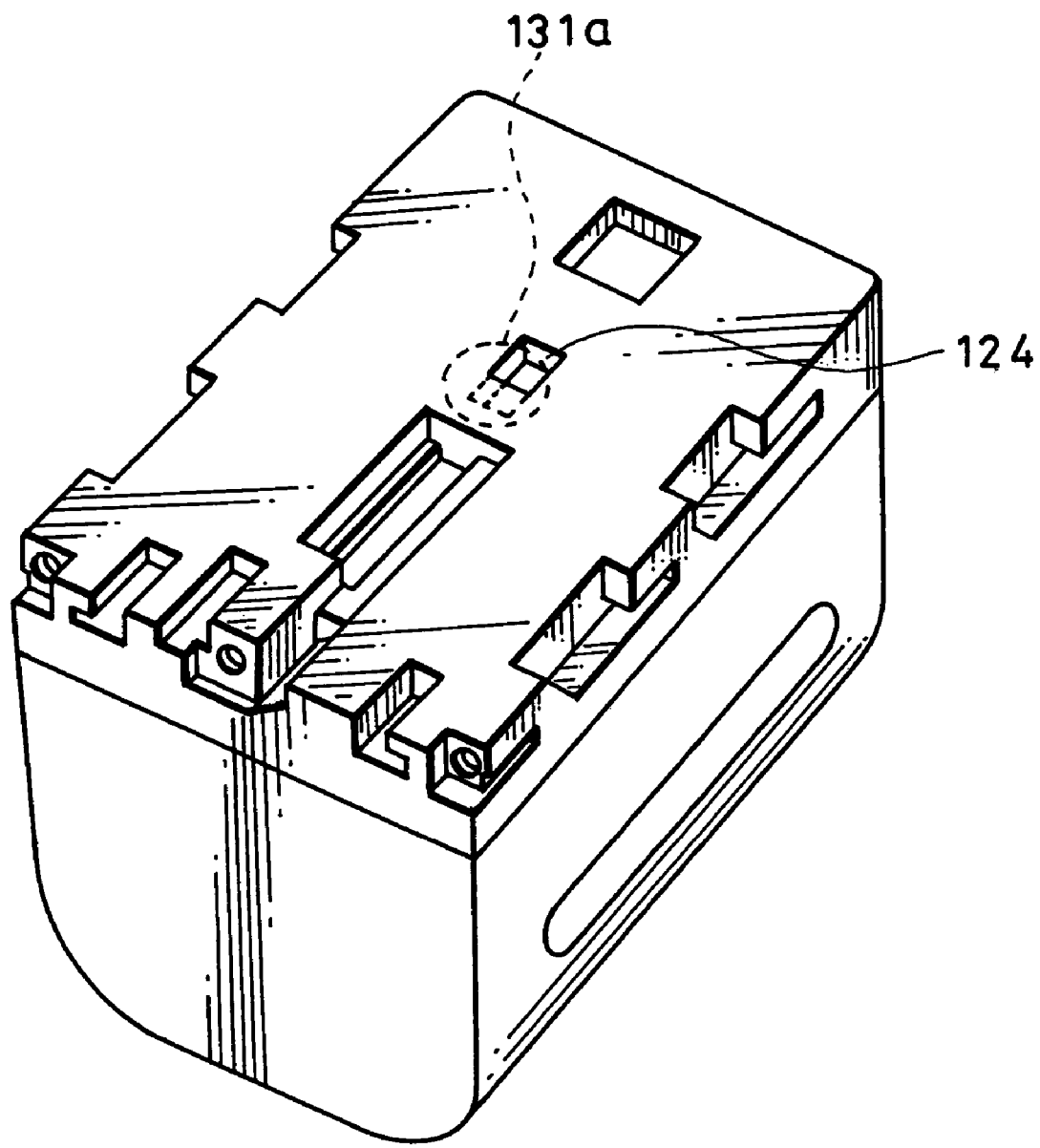
FIG. 14 is a view showing another example of the type of battery pack deciding concave portion in FIG. 3.
Figure 15:
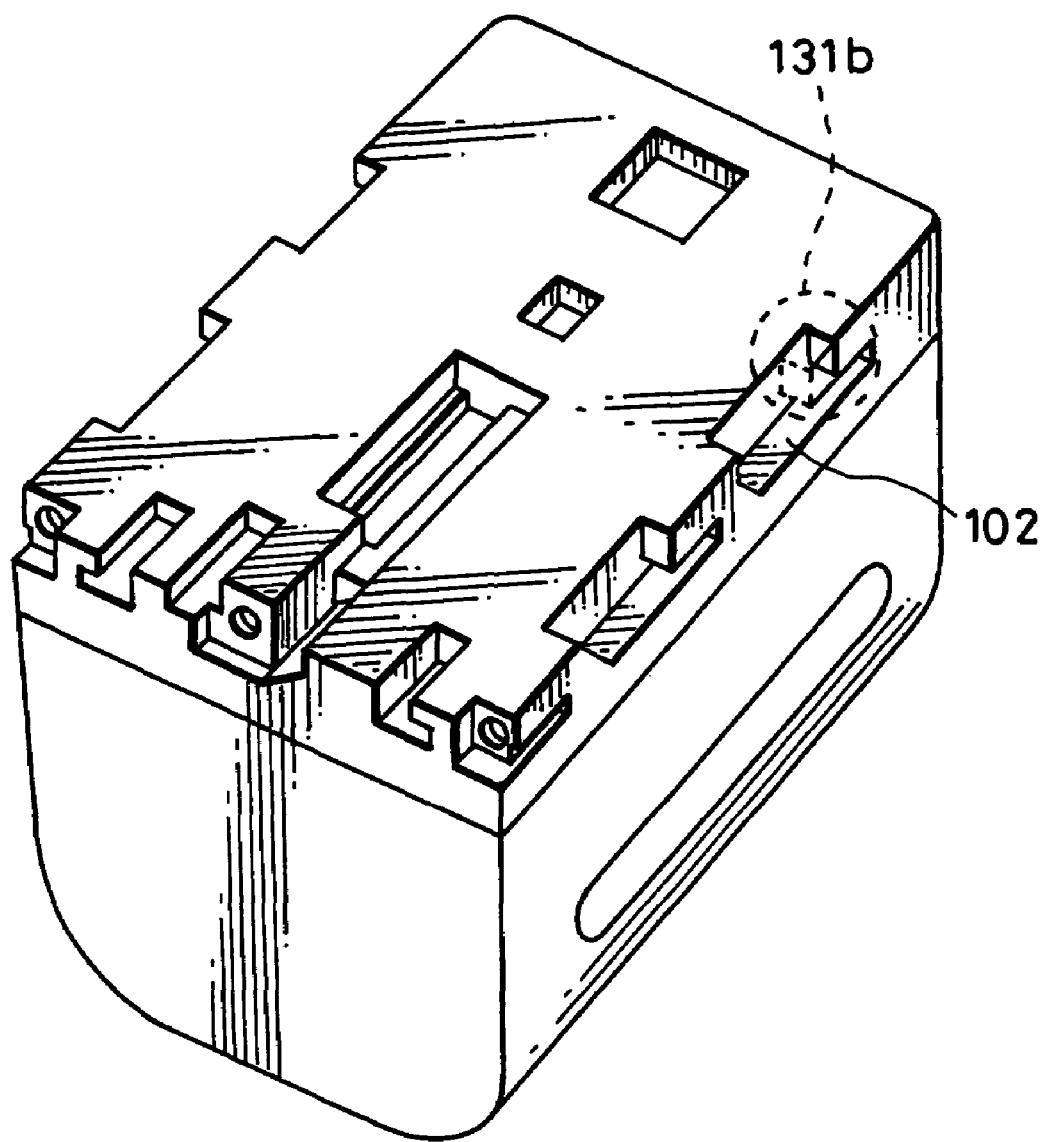
FIG. 15 is a view showing still another example of the type of battery pack deciding concave portion in FIG. 3.

It is described above that the type of battery pack deciding concave portion 131 for identifying the type of a battery pack is provided for the portion bestriding the guide portion 122 and the controlling concave portion 117. However, it is also allowed to form a type of battery pack deciding concave portion 131a on a part of the small locking concave portion 124 as shown in FIG. 14 or form a type of battery pack deciding concave portion 131b by partially cut off the convex portion which forms the guide groove 102 as shown in FIG. 15. In this case, the type of battery pack deciding switch 214 is set on the mounting face 208 of the corresponding slot 162.

Two types such as the SQ battery pack 1 and battery pack 11 are described above as types of battery packs. Moreover, it is possible to identify more types of battery packs by combining presence and absence of the type of battery pack deciding concave portions 131, 131a, and 131b as shown, for example, in FIGS. 3, 14 and 15.

Thus, it is possible to judge the type of a battery pack and charge the battery pack in a proper charging mode.

In the above description a case of identifying the charging mode of a battery pack is explained based on the shape of the battery pack, but it is to be understood that it is allowed to identify the charging mode of a battery pack in accordance with other methods. For example, it is also allowed to store the information of charging modes in a battery pack and to change the charging modes based on that information.

Figure 16:
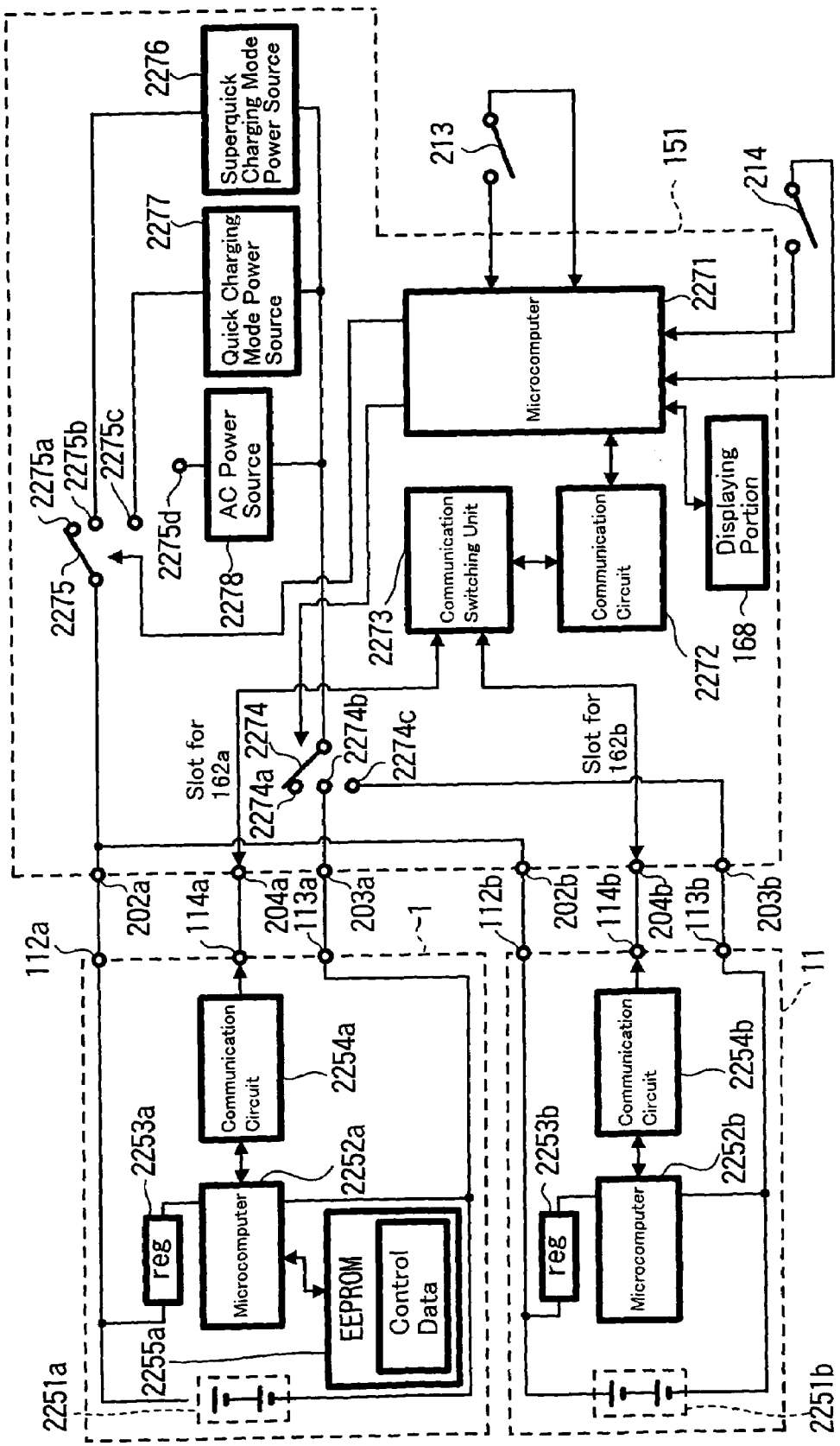
FIG. 16 is a view showing a second electrical configuration example of a SQ battery pack and a battery charger.

Therefore, another electrical configuration (second configuration example) of the SQ battery pack 1, battery pack 11 and battery charger 151 when storing the information of charging modes in a battery pack and changing charging modes in accordance with the information is described below with reference to FIG. 16. In FIG. 16, the SQ battery pack 1 is attached to the slot 162a and the battery pack 11 is attached to the slot 162b.

The battery cell 2251 of the SQ battery pack 1 is a cell which stores the power supplied from the battery charger 151 by the input/output terminals 112 and 113.

A microcomputer 2252 is constituted of a CPU, a RAM and a ROM, and driven by the power supplied through a reg 2253. The microcomputer 2252 collects not only the charged state information of the battery cell 2251 but also various information in the SQ battery pack 1, controls a communication circuit 2254, and supplies information to the battery charger 151 through the communication terminal 114.

The most suitable charging mode data are stored in an EEPROM (Electrically Erasable Programmable Read Only Memory) 2255 as control data when it is fabricated. Therefore, in case of the SQ battery pack 1, the superquick charging mode data are recorded in an EEPROM 2255a as the most suitable charging mode data.

The conventional battery pack 11 has the same configuration as the SQ battery pack 1, but battery cells 2251a and 2251b are different in characteristic and since the conventional battery pack 11 cannot be charged at a large current compared to the case of the SQ battery pack 1, it is impossible to charge the battery pack 11 in the superquick charging mode.

Next, an electrical configuration example (second configuration example) of the battery charger 151 is described below.

The microcomputer 2271 of the battery charger 151 is constituted of a CPU, a RAM and a ROM to execute various processings of the battery charger 151 and makes the displaying portion 168 display various information. Moreover, the microcomputer 2271 controls the communication circuit 2272, communicates with the microcomputer 2252 through the communication switching unit 2273 and further, the communication circuit 2254a or 2254b of the SQ battery pack 1 or battery pack 11 to obtain the control data including charging mode data.

The microcomputer 2271 controls the charging changeover switch 2274 in accordance with whether or not the charging on/off switch 213 is turned on and changes the present terminal to the terminal of the slot 162 to be charged. Specifically, the microcomputer 2271 changes the terminal 2274a which is a currently resting terminal to the terminal 2274b or 2274c corresponding to the slot 162a or 162b to be charged.

Figures 17, 19:
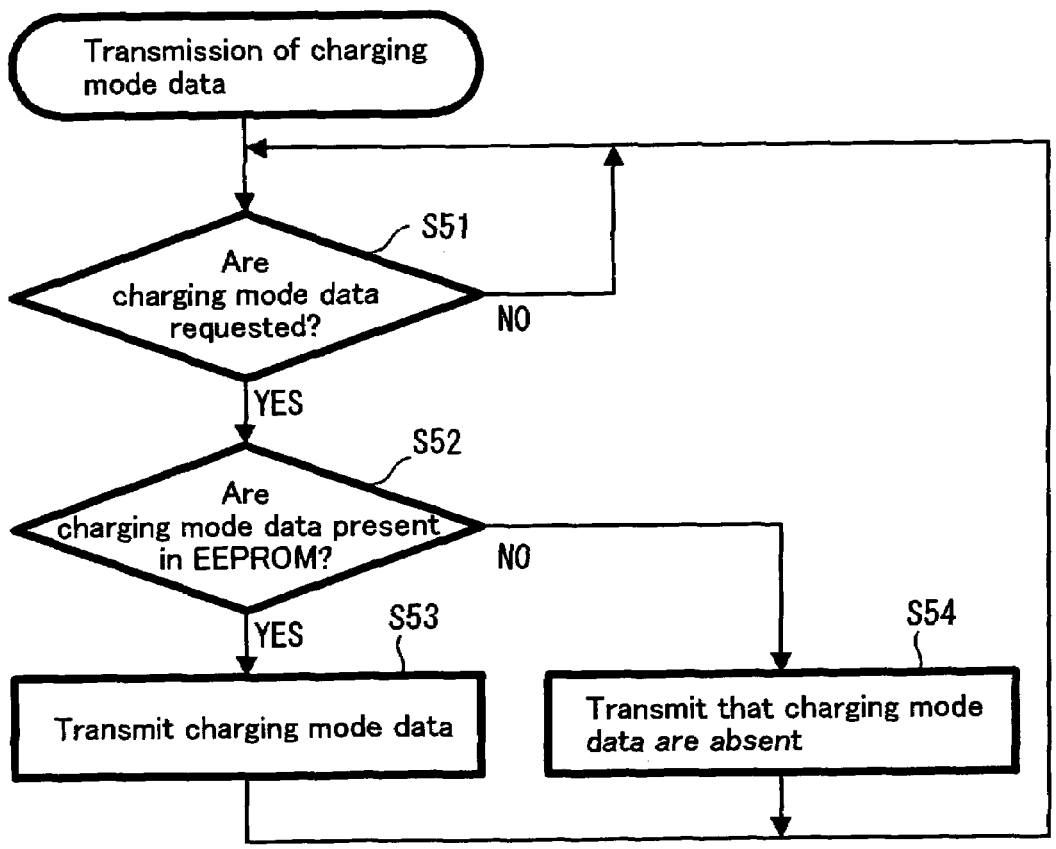
FIG. 17 is a view showing a table for deciding a charging mode of a microcomputer of a battery charger.
FIG. 19 is a flowchart for explaining an SQ battery pack or the transmission processing of the charging mode data of the SQ battery pack.

A table shown in FIG. 17 is stored in the built in ROM of the microcomputer 2271 which controls the charging mode changeover switch 2275 based on the information showing whether or not the type of battery pack deciding switch 214 is turned on and the information on presence or absence of the charging mode data in the control data obtained through the communication with a battery pack. In more detail, the microcomputer 2271 judges that a battery pack to be charged is an SQ battery pack 1 when the type of battery pack deciding switch 214 is turned on and charging mode data can be obtained through the communication and changes the charging mode changeover switch 2275 from the currently resting terminal 2275a to the superquick changeover switch 2275b connected to a superquick charging mode power source 2276. In the other case, that is, when the type of battery pack deciding switch 214 is not turned on or charging mode data cannot obtained through the communication, the microcomputer 2271 connects the charging mode changeover switch 2275 to the terminal 2275c and to change the present power source to a quick charging mode power source 2277. Moreover, when the charging mode changeover switch 2275 is changed to the terminal 2275d, an AC power source 2278 converts the power supplied from a not illustrated AC input terminal into DC power and supplies the DC power to the SQ battery pack 1.

Figure 18:
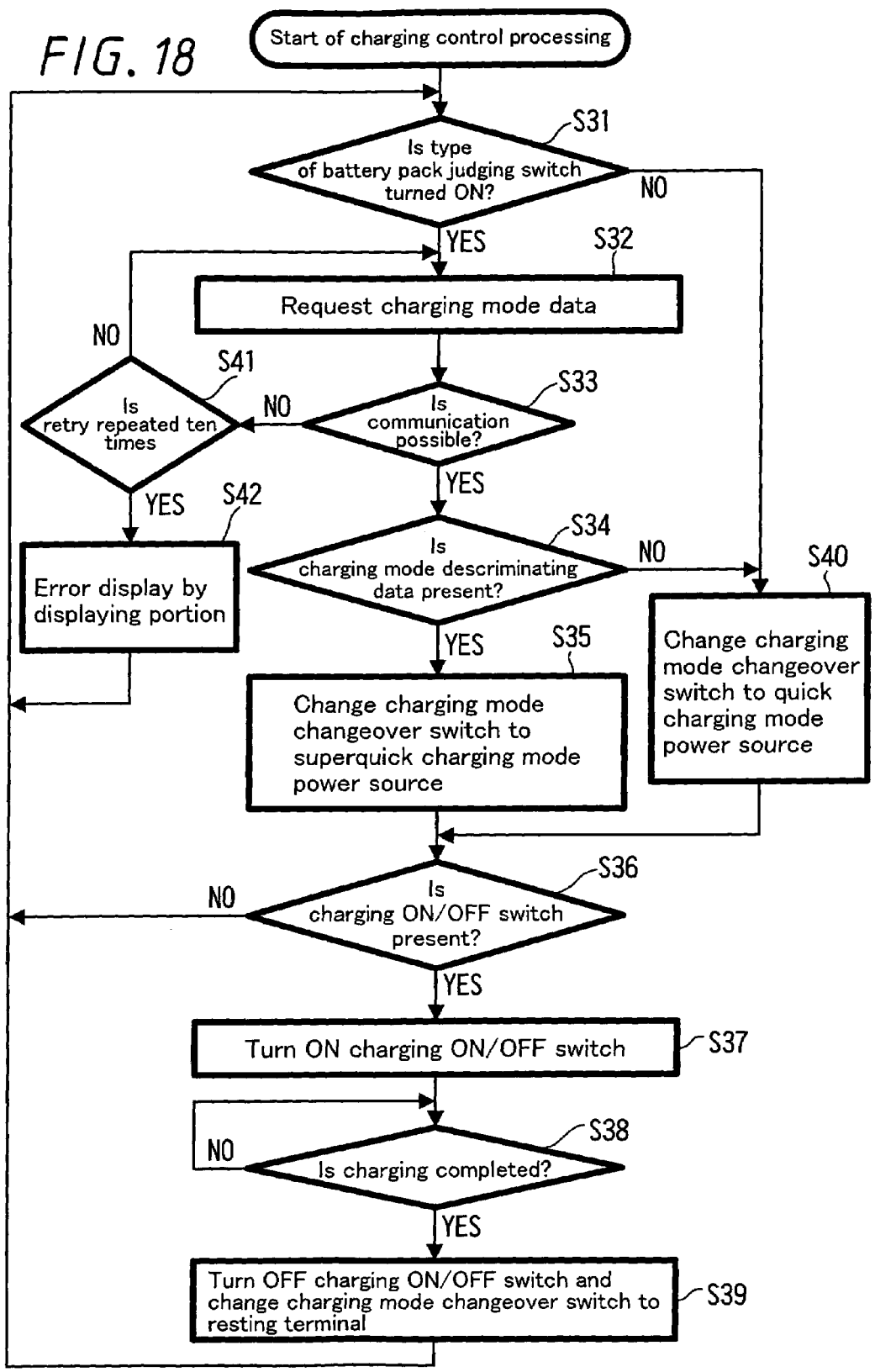
FIG. 18 is a flowchart for explaining the charging control processing by a battery charger.

Next, the charging control processing when setting the SQ battery pack 1 or battery pack 11 to the slot 162a of the battery charger 151 to perform charging is described below with reference to the flowchart shown in FIG. 18.

In a step S31, the microcomputer 2271 judges whether or not the type of battery pack deciding switch 214 is turned on. Then, as shown in FIGS. 8 and 9, when the microcomputer 2271 judges that the switch 214 is not turned on (the switch 214 is turned off), the processing advances to a step S32.

In the step S32, the microcomputer 2271 controls the communication circuit 2272 and requests the microcomputer 2252 of the SQ battery pack 1 or battery pack 11 through the communication switching unit 2273 for the charging mode data included in the control data stored in the EEPROM 2255.

Now, the transmission processing of the charging mode data of the SQ battery pack 1 or battery pack 11 is described below with reference to the flowchart shown in FIG. 19.

In a step S51, the microcomputer 2252 judges whether or not charging mode data are requested by the microcomputer 2271 of the battery charger 151 through the communication circuit 2254 and repeats this processing until the data are requested. In the step S51, when it is judged that the charging mode data is requested, the microcomputer 2252 accesses the EEPROM 2255 and confirms presence or absence of the charging mode data of the control data in a step S52. For example, in case of the SQ battery pack 1, charging mode data are stored in the EEPROM 2255 as control data and therefore it is judged that charging mode data are present and the processing advances to a step S53.

In the step S53, the microcomputer 2252 controls the communication circuit 2254 and transmits the charging mode data to the microcomputer 2271 of the battery charger 151.

In the step S52, charging mode data are not recorded, for example, in case of the conventional battery pack 11 and then in a step S54, the microcomputer 2252 transmits a fact that charging mode data is not present to the microcomputer 2271 of the battery charger 151 by controlling the communication circuit 2254 and the processing returns to the step S51 and subsequent processings are repeated.

Now, the flowchart shown in FIG. 18 is described below again.

In a step S33, the microcomputer 2271 judges whether or not communication is possible in accordance with a response from the SQ battery pack 1 or battery pack 11 attached to the slot 162a and when the microcomputer judges that communication is possible, the processing advances to a step S34.

In the step S34, the microcomputer 2271 judges whether or not charging mode data can be obtained through the communication and when obtained, the processing advances to a step S35.

In the step S35, the microcomputer 2271 refers to the table shown in FIG. 17 stored in a ROM, regards the set battery pack as an SQ battery pack 1, controls the charging mode changeover switch 2275, changes from the terminal 2275a to the terminal 2275b, and connects to the superquick charging mode power source 2276.

In a step S36, the microcomputer 2271 judges whether or not the charging on/off switch 213 is turned on and when the microcomputer judges that the switch 213 is turned on, in a step S37 it changes the charging changeover switch from the currently resting terminal 2274a to the terminal 2274b and starts charging the SQ battery pack 1.

In a step S38, the microcomputer 2271 communicates with the microcomputer 2252 of the SQ battery pack 1 through the communication circuit 2272, the communication switching unit 2273 and the communication terminals 204, 114 judges whether or not charging is completed, and repeats the processing until charging is completed. When the microcomputer judges that charging is completed, it controls the charging changeover switch 2274 to change from the terminal 2274b to the currently resting terminal 2274a and the charging mode changeover switch 2275 to change from the terminal 2275b to the terminal 2275a, and the processing returns to the step S31.

In another aspect, when the microcomputer 2271 judges in the step S31 that the switch is turned on as shown in FIGS. 10 and 11, it refers to the table shown in FIG. 17 stored in the ROM in a step S40, regards the attached battery pack as a conventional battery pack 11, controls the charging mode changeover switch 2275, changes from the terminal 2275a to the terminal 2275c, and repeats subsequent processings.

When it is judged in the step S33 that communication is not possible, the microcomputer 2271 judges in a step S41 whether or not the communication is retried ten times and when the retried communication is less than ten times, the processing returns to the step S32. In more detail, the processings in the steps S32, S33 and S41 are repeated until the retried communication goes over ten times. When it is judged in the step S42 that the retry goes over ten times, the microcomputer 2271 controls the displaying portion 168 and display an error in a step S42 and the processing returns to the step S31.

When it is judged in the step S36 that the charging on/off switch 213 is not turned on, that is, it is turned off, the processing returns to the step S31 and subsequent processings are repeated.

In the above explanation the same processing is performed when setting and charging the SQ battery pack 1 or the battery pack 11 on the slot 162b, so that the description thereof is omitted.

In the above embodiment an example of storing charging mode data in the EEPROM 2255 is described, but it is allowed to use not only an EEPROM but also another storage medium as long as charging mode data can be stored, that is, it is allowed to write the data in a flash memory or a ROM.

Moreover, according to the above described, it becomes possible to perform double way battery pack detection by a mechanical way of battery pack detection using the type of battery pack deciding switch 214 and an electrical way battery pack detection according to the presence or the absence of the charging mode data stored in the EEPROM 2255 of the SQ battery pack 1 where it is possible to prevent the conventional battery pack 11 from being broken due to an overcurrent even if a read out error due to dust put onto the type of battery pack deciding concave portion 131 and type of battery pack deciding switch 214, an intentionally generated error or a read out error in charging mode data due to an electrical noise might occur.

Moreover, even if a case occurs in which the conventional battery pack 11 and SQ battery pack 1 which are similar in shape are simultaneously used, it is possible to detect the type of a battery pack only by attaching the battery pack to the battery charger 151.

Therefore, it is possible to detect the type of a battery pack and charge the battery pack in a proper charging mode and prevent the battery pack from being broken due to an overcurrent.

An example is described above in which charging modes of a battery pack are previously memorized or stored in the battery pack for changing battery pack charging modes based on the stored information, but it is allowed to change battery pack charging modes in response to a temperature condition.

Accordingly, still another electrical configuration example (third configuration example) of the SQ battery pack 1 and battery charger 151 when battery pack charging modes are changed in accordance with a temperature condition is described below with reference to FIG. 20. In FIG. 20, the SQ battery pack 1 is set to both the slots 162a and 162b where the both configurations thereof are the same.

The battery cell 3251 of the SQ battery pack 1 is a cell for storing the power supplied from the battery charger 151 by the input/output terminals 112 and 113.

A microcomputer 3252 is constituted of a CPU, a RAM and a ROM and driven by the power supplied through a reg 3253. The microcomputer 3252 collects not only the charged state information of the battery cell 3251 but also various information in the SQ battery pack 1, controls a communication circuit 3254, and supplies the information to the battery charger 151 through the communication terminal 114. A thermistor 3252 is controlled by the microcomputer 3252 to measure and output the ambient temperature TB of the SQ battery pack 1.

The conventional battery pack 11 has the same configuration as the SQ battery pack 1 but it is different from the SQ battery pack 1 in characteristic of the battery 3251 and therefore, the battery pack 11 cannot be charged at a large current compared to the case of the SQ battery pack 1.

Next, an electrical configuration example (third configuration example) of the battery charger 151 is described below.

The microcomputer of the battery charger 151 is constituted of a CPU, a RAM and a ROM to execute various processings of the battery charger 151 and makes the displaying portion 168 display various information. A communication circuit 3272 is controlled by a microcomputer 3271 to communicate with either of SQ battery packs 1a or 1b attached to the slot 162a or 162b by means of a communication switching unit 3273.

A charging changeover switch 3274 is controlled by the microcomputer 3271 to change from a currently resting terminal 3274a to a terminal 3274b or 3274c corresponding to either of the slots 162a and 162b to be charged when charging is started.

A charging mode changeover switch 3275 is controlled by the microcomputer 3271 to change the current mode to a charging mode corresponding to on state or off state of the type of battery pack deciding switch 214. That is, the charging changeover switch 3275 is changed from a currently resting terminal 3275a to a terminal 3275c connected to a quick charging mode power source 3277 in case of the battery pack 11 and to a terminal 3275b connected to a superquick charging mode power source 3276 in case of the SQ battery pack 1 under charging in accordance with the type of a battery pack attached to the slot 162. Moreover, when the battery pack ambient temperature TB measured by the thermistor 3255 of the SQ battery pack 1 is not kept in a set temperature range, the charging mode changeover switch 3275 is changed to a small current charging mode power source 3278. The small current charging mode power source 3278 is a power source requiring a small charging current compared to the quick charging mode power source 3277 and superquick charging mode power source 3276. A proper temperature range is set to the SQ battery pack 1 and battery pack 11. Therefore, when the SQ battery pack 1 and battery pack 11 are charged in a range other than the proper temperature range, they cause the same phenomenon as the case of an overcurrent. Therefore, the small current charging mode power source 3278 is a power source for performing charging by using a small charging current value in order to avoid the above phenomenon. Moreover, when the charging mode changeover switch 3275 is changed to a terminal 3275e, an AC power source 3280 converts the power supplied from a not illustrated external input terminal into DC power and supplies the DC power to the SQ battery pack 1.

A thermistor 3279 is controlled by the microcomputer 3271 to measure the ambient temperature of the battery charger 151 and output the measured temperature to the microcomputer 3271.

Then, the charging control processing when attaching the SQ battery pack 1 to the slot 162a of the battery charger 151 and charging the SQ battery pack 1 is described below with reference to the flowchart shown in FIG. 21.

In a step S71, the microcomputer 3271 controls the thermistor 3279 and obtains the battery charger ambient temperature TC to judge whether or not the temperature TC is lower than the upper limit temperature TCU of a battery charger ambient temperature (the upper limit temperature TCU of a battery charger ambient temperature is set to, for example, 65.degree. C.). For example, when it is judged that the battery charger ambient temperature TC is lower than its upper limit temperature TCU, the microcomputer 3271, in a step S72, controls the communication circuit 3272, requests the battery pack ambient temperature TB to the communication circuit 3254a of the SQ battery pack 1a attached to the slot 162a, obtains the temperature TB, and judges whether or not the temperature TB is kept in the range between the upper limit temperature TBU (upper limit temperature TBU is set to, for example, 65.degree. C.) and the lower limit temperature TBL (lower limit temperature TBL is set to, for example, 0.degree. C.).

Figure 22:
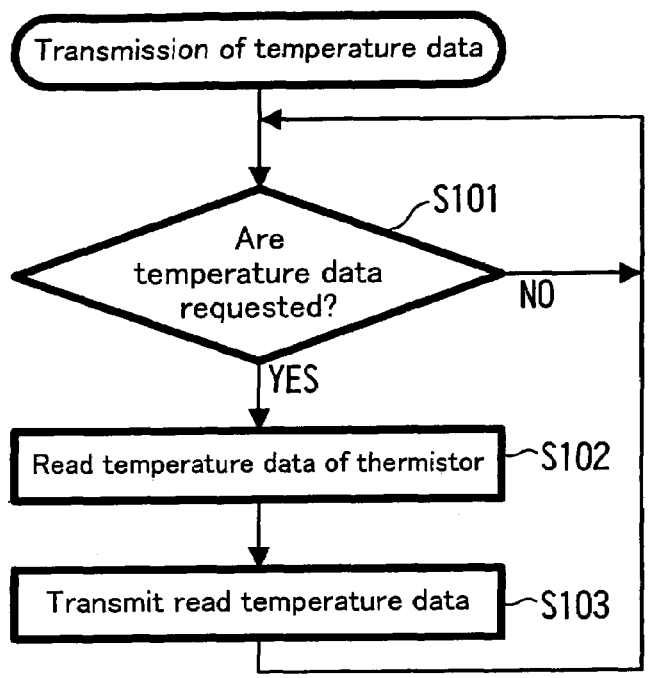
FIG. 22 is a flowchart for explaining the transmission processing of temperature data by the SQ battery pack in FIG. 3.

The processing is described below with reference to the flowchart in FIG. 22, in which the SQ battery pack 1a receives a request for the battery pack ambient temperature TB from the microcomputer 3271 of the battery charger 151 and transmits the ambient temperature TB.

In a step S101, a microcomputer 3252a judges whether not the request for the battery pack ambient temperature TB is received from the battery charger 151 and when the microcomputer 3252a judges that the battery pack ambient temperature TB is requested, for example, in accordance with the processing in the step S72 in the flowchart in FIG. 21, it reads the battery pack ambient temperature TB measured by a thermistor 3255a in a step S102.

In a step S103, the microcomputer 3252 controls a communication circuit 354, transmits the read out battery pack ambient temperature TB to the battery charger 151, and the processing returns to step S101 and subsequent processings are repeated.

Hereinafter the processing for the SQ battery pack 1 to transmit the battery pack ambient temperature TB is the same, so that the description of that processing is omitted.

Back to the flowchart in FIG. 21 the explanation thereof will be done again.

When it is judged in the step S72 that the battery pack ambient temperature TB is kept in the range between the upper limit temperature TBU and the lower limit temperature TBL, the microcomputer 3271 controls the charging mode changeover switch 3275 to change from the currently resting terminal 3275a to the terminal 3275b.

In a step S74, the microcomputer 3271 judges whether or not the charging on/off switch 213 is turned on. When it is judged that the switch 213 is turned on, the processing advances to a step S75.

In the step S75, it is judged whether the charging changeover switch 3274 is turned on, that is, the charging changeover switch 3274 is changed to the terminal 3274b in order to supply power to the slot 162a. For example, in case of the first processing, that is, when the charging changeover switch 3274 is connected to the currently resting terminal 3274a, it is judged that the charging changeover switch 3274 is not turned on and in a step S76, the microcomputer 3271 controls the charging changeover switch 3274 and connects the switch 3274 to the terminal 3274b to turn on the switch 3274.

In a step S77, the microcomputer 3271 controls the thermistor 3279, obtains the battery charger ambient temperature TC and judges whether or not the temperature TC is lower than its upper limit temperature TCU and when the microcomputer judges that the temperature TC is lower than the upper limit temperature TCU, the processing advances to a step S78.

In the step S78, the microcomputer 3271 controls the communication circuit 3272, obtains the battery pack ambient temperature TB, and judges whether or not the battery pack ambient temperature TB is kept in the range between the upper limit temperature TBU and lower limit temperature TBL. When the microcomputer judges that the temperature TB is kept in the range, the processing advances to a step S79.

In the step S79, the microcomputer 3271 communicates with the microcomputer 3252a through the communication circuit 3272, the communication switching unit 3273 and the communication terminals 204 and 114, and judges whether or not charging is completed. When the microcomputer 3271 judges that charging is completed, in a step S82 it changes the charging mode changeover switch 3275 to the terminal 3275a and turns off the terminal 3275a (pause) and moreover, changes the charging changeover switch 3274 to the terminal 3274a to complete charging.

When the battery charger ambient temperature TC is not lower than its upper limit temperature TCU in the step S71, the microcomputer 3271 controls the displaying portion 168 in a step S81, makes its charging trouble displaying portion 181 display that a "charging trouble" occurs, and subsequent processings are repeated. Accordingly, in this case, the microcomputer 3271 stops charging in a step S11.

In the step S72, when it is judged that the battery pack ambient temperature TB is not kept in the range between its upper limit temperature TBU and lower limit temperature TBL, the microcomputer 3271 judges whether or not the battery pack ambient temperature TB is lower than its lower limit temperature TBL in a step S82.

Figure 23:
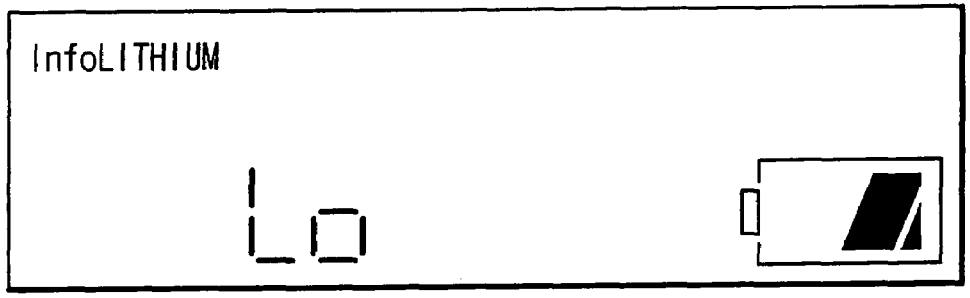
FIG. 23 is a view showing a displayed example of the displaying portion in FIG. 5.
Figure 24:
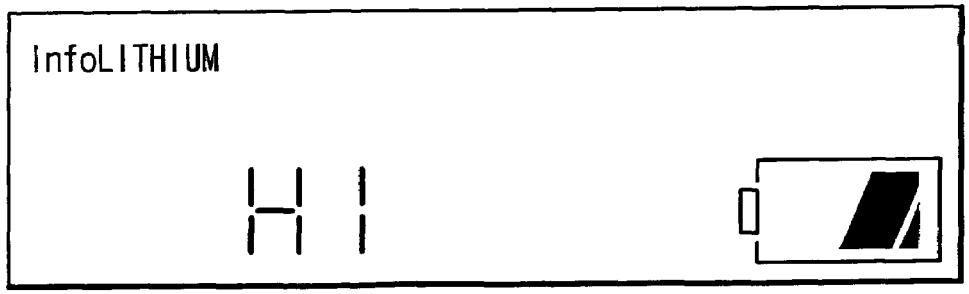
FIG. 24 is a view showing a displayed example of the displaying portion in FIG. 5.

When it is judged in the step S82 that the battery pack ambient temperature TB is lower than its lower limit temperature TBL, the microcomputer 3271 controls, in the step S83, the displaying portion 168 such that the latter displays "Lo" corresponding to Lower as shown in FIG. 23 and displays that charging is currently performed in a small current charging mode based on the temperature TB which is lower than the proper temperature range.

In a step S85, the microcomputer 3271 controls the charging mode changeover switch 3275 to select the terminal 3275c and change to the small current charging mode power source 3278, and then subsequent processings repeat.

When it is judged in the step S82 that the battery pack ambient temperature TB is not lower than its lower limit temperature TBL, that is, when it is judged that the battery pack ambient temperature TB is equal to or higher than its lower limit temperature TBU, the microcomputer 3271 controls, in a step S84, the displaying portion 168 such that the latter displays "Hi" corresponding to Higher as shown in FIG.

24 and displays that charging currently performed is in a small current charging mode based on the temperature TB which is higher than the proper temperature range.

When it is judged in a step S74 that the charging on/off switch 213 is not turned on, processings in the steps S75 to S79 are skipped and the processing advances to the step S80 and charging is stopped.

When it is judged in the step S75 that the charging changeover switch 3274 is turned on, the processing in the step S76 is skipped. In this case, it is regarded that charging is already currently performed and the state of the charging changeover switch 3274 is maintained.

When it is judged in the step S77 that the battery charger ambient temperature TC is not lower than its upper limit temperature TCU, the processing advances to the step S81.

When it is judged in the step S78 that the battery pack ambient temperature TB is not kept in the range between its upper limit temperature TBU and lower limit temperature TBL, the microcomputer 3271 judges in a step S86 whether or not the charging mode changeover switch 3275 is currently connected to the small current charging mode power source 3278, and when it is judged that the switch 3275 is connected to the small current charging mode power source 3278, the processing returns to the step S79, and when it is judged that the switch 3275 is not connected to the power source 3278, the processing returns to the step S82.

This is to say, the charging control processing in the small current charging mode is returned to the original processing, because there is no restriction of a battery pack ambient temperature therein. Accordingly, in the processing of the step S86 the fact that the switch is not connected to the small current charging mode power source 3278 denotes that the switch is connected to the superquick charging mode power source 3276, so that the processing returns to the processing after the step S82 and executes charging in the small current charging mode.

In the above description, an example of changing to the small current mode charging in accordance with a temperature condition is explained, but it is also allowed to set charging modes other than the above mode and in this case, it is possible to perform charging at a high speed without decreasing the charging capacity of a battery pack by changing charging voltages and charging currents in various manners and by setting the maximum voltage and maximum current suitable for a temperature condition as a power source.

As described above, by measuring the temperature around a battery pack and a battery charger, it is possible to charge the battery pack in a proper charging mode corresponding to a temperature condition and hence it becomes possible to suppress the decrease of a charging capacity due to an overcurrent which occurs when charging a battery pack in a temperature range which is out of the proper range.

A series of the above processings can be executed not only by hardware or but also by software. To execute a series of processings by software, a program constituting the software is installed from a program storing medium into a computer incorporated in exclusive hardware, a general purpose personal computer, for example, capable of executing various functions by installing various programs and the like.

Figure 25:
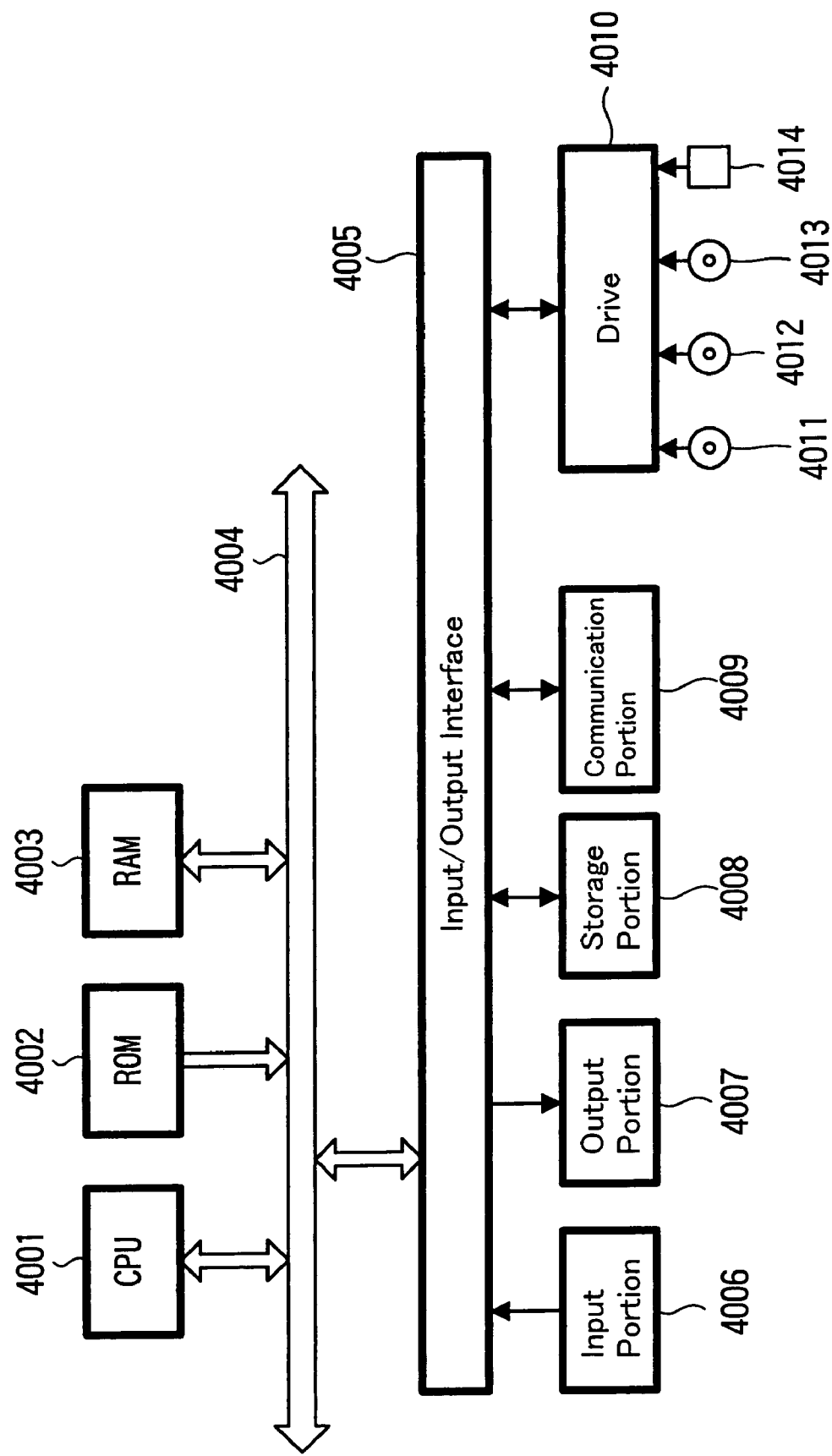
FIG. 25 is a view for explaining a program storing medium.

FIG. 25 shows a configuration of an embodiment of a personal computer when realizing the battery charger 151 by software. The CPU 4001 of the personal computer controls all operations of the personal computer. Further, when a command is input to the CPU 4001 by a user in an input portion 4006 composed of a keyboard, a mouse and the like through a bus 4004 and an input/output interface 4005, the CPU 4001 correspondingly executes a program stored in a ROM (Read Only Memory) 4002. Alternately, the CPU 4001 executes a program which is installed in a storage portion 4008 and loaded into a RAM (Random Access Memory) 4003 where the program is read from a magnetic disc 4011, an optical disc 4012, a magneto-optical disc 4013 or a semiconductor memory 4014 connected to a drive 4010. Additively the CPU 4001 controls a communication portion 4009 and communicates with an external unit and executes exchanging of data.

As shown in FIG. 25, aside the computer, a program storing medium in which programs are recorded is not only constituted of package media which is distributed to provide a program for users and in which programs are recorded such as the magnetic disc 4011 (including flexible disc), optical disc 4012 (including CD ROM (Compact Disc Read Only Memory) and DVD (Digital Versatile Disc), magneto-optical disc 4013 (including MD (Mini Disc) or semiconductor memory 4014 but also constituted of the ROM 4002, a hard disc included in the storage portion 4008 or the like which is provided for users by being built in the computer beforehand and in which programs are recorded.

In this description, steps of describing programs which are recorded in a program storing medium include not only processings to be performed in time sequence along the described sequence but also processings to be executed in parallel or individually instead of being performed in time sequence.

Further, in this description, a system denotes the whole system constituted of a plurality of units.

According to a first charging/discharging apparatus of the present invention, a relative position with a power supplying apparatus is controlled and a receivable power supplying mode is set such that a receiving terminal for receiving power from the power supplying apparatus and a supplying terminal for the power supplying apparatus to supply power are connected each other.

According to a first power supplying apparatus and method and a first program of the present invention, presence or absence of a setting portion is detected, a power supplying mode is identified in accordance with a detection result, and power is supplied to a charging/discharging apparatus from a supplying terminal in the identified power supplying mode.

According to a first power supplying system of the present invention, a charging/discharging apparatus controls a relative position with a power supplying apparatus such that a receiving terminal for receiving power from the power supplying apparatus and a supplying terminal for the power supplying apparatus to supply power are connected each other, sets a receivable power supplying mode and the power supplying apparatus detects presence or absence of a setting portion, identifies a power supplying mode in accordance with a detection result, and supplies power to the charging/discharging apparatus from the supplying terminal in the identified power supplying mode.

According to a second charging/discharging apparatus and method and a second program of the present invention, the information showing a receivable power supplying mode is stored and the stored information showing the power supplying mode is transmitted to a power supplying apparatus.

According to a second power supplying apparatus and method and a third program of the present invention, the information showing a receivable power supplying mode is received from a charging/discharging apparatus so as to supply power to the charging/discharging apparatus correspondingly to the received power supplying mode.

According to a second power supplying system and a power supplying method of the second power supplying system, and a fourth program of the present invention, a charging/discharging apparatus stores the information showing a receivable power supplying mode, transmits the stored information showing the power supplying mode, and power supplying apparatus receives the information showing the receivable power supplying mode from the charging/discharging apparatus and supplies power to the charging/discharging apparatus correspondingly to the received power supplying mode.

According to a third charging/discharging apparatus and method and a fifth program of the present invention, the internal temperature of its own is measured and the measured internal temperature data are transmitted to a power supplying apparatus.

According to a third power supplying apparatus and method and a sixth program of the present invention, the internal temperature data of a charging/discharging apparatus are received from a charging/discharging apparatus, the internal temperature of its own is measured, and power supplying modes of the power to be supplied to the charging/discharging apparatus are changed based on the received internal temperature data of the charging/discharging apparatus or measured temperature data of its own.

According to a third power supplying system and a power supplying method of the third power supplying system, and a seventh program of the present invention, a charging/discharging apparatus measures the internal temperature of the charging/discharging apparatus, transmits the measured internal temperature data of the charging/discharging apparatus to a power supplying apparatus, and the power supplying apparatus receives the internal temperature data of the charging/discharging apparatus transmitted from the charging/discharging apparatus and changes power supplying modes of the power to be supplied to the charging/discharging apparatus in accordance with the received internal temperature data of the charging/discharging apparatus or the measured internal temperature data of the power supplying apparatus.

As a result, it is possible to charge a charging/discharging apparatus in a proper power supplying mode based on the type or temperature of a charging/discharging apparatus in any case and prevent a charging capacity from deteriorating or damaging due to an overcurrent generated when charging the charging/discharging apparatus.

DESCRIPTION OF REFERENCE NUMERALS

1 . . . SQ BATTERY PACK
131 . . . TYPE OF BATTERY pack deciding concave PORTION
162, 162a, 162b . . . SLOT
213 . . . CHARGING ON/OFF SWITCH
214 . . . TYPE OF BATTERY pack deciding switch
1271 . . . MICROCOMPUTER
1274 . . . CHARGING CHANGEOVER SWITCH
1275 . . . CHARGING MODE CHANGEOVER SWITCH
1276 . . . SUPERQUICK CHARGING MODE POWER SOURCE
1277 . . . QUICK CHARGING MODE POWER SOURCE
2252, 2252a, 2252b . . . MICROCOMPUTER
2271, 2271a, 2271b . . . MICROCOMPUTER
2274 . . . CHARGING CHANGEOVER SWITCH
2275 . . . CHARGING MODE CHANGEOVER SWITCH
2276 . . . SUPERQUICK CHARGING MODE POWER SOURCE
2277 . . . QUICK CHARGING MODE POWER SOURCE
3255, 3255A, 3255B . . . THERMISTOR
3271 . . . MICROCOMPUTER
3274 . . . CHARGING CHANGEOVER SWITCH
3275 . . . CHARGING MODE CHANGEOVER SWITCH
3276 . . . SUPERQUICK CHARGING MODE POWER SOURCE
3277 . . . QUICK CHARGING MODE POWER SOURCE
3278 . . . SMALL CURRENT CHARGING MODE POWER SOURCE
3279 . . . THERMISTOR

The invention claimed is:

1. A charging/discharging apparatus comprising:
a receiving terminal for receiving power from a power supplying apparatus;
a position controlling portion for controlling a position of the receiving terminal relative to said power supplying apparatus such that said receiving terminal is connected to a supplying terminal to which said power supplying apparatus supplies power;
a transmitting terminal for transmitting charging mode determining data indicating which of a plurality of power supplying modes the power supplying apparatus is to operate in; and
a recessed setting portion provided in association with a deciding switch of the power supplying apparatus indicating which of a plurality of power supplying modes the power supplying apparatus is to operate in,
wherein one of a plurality of power supplying modes is selected as a function of both 1) the shape of the recessed setting portion which identifies a type of charging/discharging apparatus and 2) a presence/absence of charging mode data transmitted to the power supplying apparatus via the transmitting terminal,
wherein the shape of the recessed setting portion indicating the type of charging/discharging apparatus and a transmission of data in response to a request for charging mode data triggers a charging mode changeover switch in the power supplying apparatus to change from a resting terminal to one of two power supply mode terminals, and
wherein, after the charging mode changeover switch is changed to a power supply mode terminal, a charging changeover switch is changed to a power supplying terminal for one of two power supplying modes.

2. The charging/discharging apparatus according to claim 1, wherein said power supplying mode further comprises a first mode or a second mode.

3. The charging/discharging apparatus according to claim 2, wherein an electrical current value for supplying power in said first mode is larger than that in said second mode.

4. A power supply apparatus for supplying power to a charging/discharging apparatus including a recessed setting portion for setting a receivable power supplying mode, comprising:
detecting means for detecting presence or absence of said recessed setting portion when the charging/discharging apparatus is coupled to the power supply apparatus;
identifying means for identifying which of a plurality of modes to operate in when supplying power to the charging/discharging apparatus in accordance with a detection result obtained by said detecting means;
receiving means for receiving charging mode determining data indicating which of a plurality of power supplying modes to operate in when supplying power to the charging/discharging apparatus; and
power supplying means for supplying said power to said charging/discharging apparatus from a supply terminal in said power supplying mode in accordance with the identifying means and the charging mode determining data, wherein one of a plurality of power supplying modes is selected as a function of both 1) the shape of the recessed setting portion which identifies a type of charging/discharging apparatus and 2) a presence/absence of charging mode data transmitted to the power supplying apparatus via the transmitting terminal wherein the shape of the recessed setting portion indicating the type of charging/discharging apparatus and a transmission of data in response to a request for charging mode data triggers a charging mode changeover switch in the power supplying, apparatus to change from a resting terminal to one of two power supply mode terminals, and wherein, after the charging mode changeover switch is changed to a power supply mode terminal, a charging changeover switch is changed to a power supplying terminal for one of two power supplying modes.

5. The power supply apparatus according to claim 4, wherein said power supplying mode comprises a first mode or a second mode.

6. The power supply apparatus according to claim 5, wherein an electrical current value for supplying power in said first mode is larger than that in said second mode.

7. The power supply apparatus according to claim 4, further comprising:
second detecting means for detecting whether or not said charging/discharging apparatus is coupled to the power supply apparatus;
wherein said detecting means detects presence or absence of said setting portion prior to detection that said charging/discharging apparatus is coupled to the power supply apparatus by said second detecting means.

8. A power supplying method for supplying power to a charging/discharging apparatus including a recessed setting portion for setting a receivable power supplying mode, the method comprising:
detecting presence or absence of said recessed setting portion when said charging/discharging apparatus is connected to a power supply apparatus;
identifying which of a plurality of modes to operate in when supplying power to the charging/discharging apparatus in accordance with a detection result of the detecting step;
receiving charging mode determining data indicating which of a plurality of power supplying modes to operate in when supplying power to the charging/discharging apparatus; and
supplying said power to said charging/discharging apparatus from a supplying terminal in said power supplying mode in accordance with the identifying means and the charging mode determining data,
selecting one of a plurality of power supplying modes as a function of both 1) the shape of the recessed setting portion which identifies a type of charging/discharging apparatus and 2) a presence/absence of charging mode data transmitted to the power supplying apparatus via the transmitting terminal,
wherein the shape of the recessed setting portion indicating the type of charging/discharging apparatus and a transmission of data in response to a request for charging mode data triggers a charging mode changeover switch in the power supplying apparatus to change from a resting terminal to one of two power supply mode terminals, and
wherein, after the charging mode changeover switch is changed to a power supply mode terminal, a charging changeover switch is changed to a power supplying terminal for one of two power supplying modes.

9. A power supplying system comprising a charging/discharging apparatus and a power supplying apparatus:
the charging/discharging apparatus comprising:
a receiving terminal for receiving power from the power supplying apparatus;
a position controlling portion for controlling a position of the receiving terminal relative to said power supplying apparatus such that said receiving terminal is connected with a supplying terminal to which said power supplying apparatus supplies power when said charging/discharging apparatus is attached to the power supplying apparatus; and
a transmitting terminal for transmitting charging mode determining data indicating which of a plurality of power supplying modes the power supplying apparatus is to operate in; and
a recessed setting portion provided in association with a deciding switch of the power supplying apparatus indicating which of a plurality of power supplying modes the power supplying apparatus is to operate in; and
said power supplying apparatus comprising:
setting portion detecting means for detecting presence or absence of said recessed setting portion when said charging/discharging apparatus is connected to said power supplying apparatus;
identifying means for identifying which of a plurality of modes to operate in when supplying power to the charging/discharging apparatus in accordance with a detection result obtained by said detecting means;
receiving means for receiving charging mode determining data indicating which of a plurality of power supplying modes to operate in when supplying power to the charging/discharging apparatus; and
power supplying means for supplying said power to said charging/discharging apparatus from a supply terminal in said power supplying mode,
wherein one of a plurality of power supplying modes is selected as a function of both 1) the shape of the recessed setting portion which identifies a type of charging/discharging apparatus and 2) a presence/absence of charging mode data transmitted to the power supplying apparatus via the transmitting terminal,
wherein the shape of the recessed setting portion indicating the type of charging/discharging apparatus and a transmission of data in response to a request for charging mode data triggers a charging mode changeover switch in the power supplying apparatus to change from a resting terminal to one of two power supply mode terminals, and
wherein, after the charging mode changeover switch is changed to a power supply mode terminal, a charging changeover switch is changed to a power supplying terminal for one of two power supplying modes.

* * * * *